United States Patent
Hermon et al.

(10) Patent No.: US 11,675,972 B2
(45) Date of Patent: Jun. 13, 2023

(54) DIGITAL PROCESSING SYSTEMS AND METHODS FOR DIGITAL WORKFLOW SYSTEM DISPENSING PHYSICAL REWARD IN COLLABORATIVE WORK SYSTEMS

(71) Applicant: MONDAY.COM LTD., Tel Aviv (IL)

(72) Inventors: Michael Hermon, Tel Aviv (IL); Roy Drabkin, Herzliya (IL); Joel Goldstein, Tel Aviv (IL); Roy Mann, Tel Aviv (IL)

(73) Assignee: Monday.com LTD., Tel Aviv (IL)

(*) Notice: Subject to any disclaimer, the term of this patent is extended or adjusted under 35 U.S.C. 154(b) by 0 days.

(21) Appl. No.: 17/243,691

(22) Filed: Apr. 29, 2021

(65) Prior Publication Data
US 2021/0357412 A1    Nov. 18, 2021

Related U.S. Application Data

(63) Continuation of application No. PCT/IB2021/000297, filed on Apr. 28, 2021, which is
(Continued)

(51) Int. Cl.
*G06Q 10/10* (2023.01)
*G06Q 10/0633* (2023.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC .......... G06F 16/24564; G05B 13/0265; G06Q 10/103; B65D 83/0409
See application file for complete search history.

(56) References Cited

U.S. PATENT DOCUMENTS 4,972,314 A   11/1990  Getzinger et al.
5,220,657 A    6/1993  Bly et al.
(Continued)

FOREIGN PATENT DOCUMENTS

CA    2 828 011 A1    9/2012
CN    103064833 A     4/2013
(Continued)

OTHER PUBLICATIONS

D'Alessio et al., Monday.com Walkthrough 2018\All Features, Platforms & Thoughts, (https://www.youtube.com/watch?v=ajBtOzTlhC8&t=352s), Mar. 1, 2018, Screenshots and transcript pp. 1-55, (Year: 2018).
(Continued)

Primary Examiner — Matthew J Ellis
(74) Attorney, Agent, or Firm — Finnegan, Henderson, Farabow, Garrett & Dunner

(57) ABSTRACT

Systems, methods, and computer-readable media for providing physical rewards from disbursed networked dispensers are disclosed. The systems and methods may involve at least one processor configured to: maintain and cause to be displayed a workflow table having rows, columns and cells; track a workflow milestone via a designated cell configured to maintain data indicating that the workflow milestone is reached; access a data structure storing a rule containing a condition associated with the designated cell and a conditional trigger associated with at least one dispenser; receive an input via the designated cell; compare the input with the condition to determine a match; and activate the conditional trigger to cause at least one dispensing signal to be transmitted over a network to the at least one dispenser to cause the at least one dispenser to dispense a physical item as a result of the milestone being reached.

25 Claims, 18 Drawing Sheets

Related U.S. Application Data a continuation-in-part of application No. PCT/IB2021/000024, filed on Jan. 14, 2021, and a continuation-in-part of application No. PCT/IB2021/000090, filed on Feb. 11, 2021, and a continuation-in-part of application No. PCT/IB2020/000658, filed on Aug. 7, 2020, and a continuation-in-part of application No. PCT/IB2020/000974, filed on Nov. 17, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | | |
|---|---|---|
| *G06Q 10/101* | (2023.01) | |
| *G06Q 10/0631* | (2023.01) | |
| *G06F 16/14* | (2019.01) | |
| *G06F 16/23* | (2019.01) | |
| *G06F 16/25* | (2019.01) | |
| *G06F 16/11* | (2019.01) | |
| *H04L 67/1095* | (2022.01) | |
| *G06F 3/0482* | (2013.01) | |
| *G06F 3/14* | (2006.01) | |
| *H04L 51/046* | (2022.01) | |
| *G06F 40/279* | (2020.01) | |
| *G06F 40/40* | (2020.01) | |
| *G06F 40/30* | (2020.01) | |
| *G06F 3/04817* | (2022.01) | |
| *G06F 3/16* | (2006.01) | |
| *H04L 12/18* | (2006.01) | |
| *G06F 16/22* | (2019.01) | |
| *G06F 16/2455* | (2019.01) | |
| *G06F 16/248* | (2019.01) | |
| *G06F 40/177* | (2020.01) | |
| *H04L 65/401* | (2022.01) | |
| *G06F 40/186* | (2020.01) | |
| *G06F 3/0484* | (2022.01) | |
| *G06F 11/30* | (2006.01) | |
| *G06F 11/34* | (2006.01) | |
| *G06F 40/103* | (2020.01) | |
| *G06F 3/04845* | (2022.01) | |
| *G06T 11/20* | (2006.01) | |
| *G06F 16/909* | (2019.01) | |
| *G06F 16/9038* | (2019.01) | |
| *G06F 16/9032* | (2019.01) | |
| *G06F 16/901* | (2019.01) | |
| *G06F 16/951* | (2019.01) | |
| *G06F 16/9536* | (2019.01) | |
| *G06F 16/28* | (2019.01) | |
| *G06F 16/26* | (2019.01) | |
| *G06F 40/253* | (2020.01) | |
| *H04L 51/18* | (2022.01) | |
| *G06F 16/903* | (2019.01) | |
| *G06F 16/31* | (2019.01) | |
| *G06F 9/54* | (2006.01) | |
| *H04L 51/48* | (2022.01) | |
| *G06N 20/00* | (2019.01) | |
| *G06F 40/106* | (2020.01) | |
| *H04L 51/04* | (2022.01) | |
| *G05B 13/02* | (2006.01) | |
| *G06F 18/22* | (2023.01) | |
| *B65D 83/04* | (2006.01) | |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 18/22* (2023.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/48* (2022.05); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(56) References Cited

U.S. PATENT DOCUMENTS

| | | | |
|---|---|---|---|
| 5,479,602 A | | 12/1995 | Baecker et al. |
| 5,517,663 A | | 5/1996 | Kahn |
| 5,632,009 A | | 5/1997 | Rao et al. |
| 5,682,469 A | | 10/1997 | Linnett et al. |
| 5,696,702 A | * | 12/1997 | Skinner .................. G06F 11/34 |
| | | | 702/186 |
| 5,726,701 A | | 3/1998 | Needham |
| 5,787,411 A | | 7/1998 | Groff et al. |
| 5,880,742 A | | 3/1999 | Rao et al. |
| 5,933,145 A | | 8/1999 | Meek |
| 6,016,438 A | | 1/2000 | Wakayama |
| 6,016,553 A | | 1/2000 | Schneider et al. |
| 6,023,695 A | | 2/2000 | Osborn et al. |
| 6,034,681 A | | 3/2000 | Miller et al. |
| 6,049,622 A | | 4/2000 | Robb et al. |
| 6,088,707 A | | 7/2000 | Bates et al. |
| 6,108,573 A | | 8/2000 | Debbins et al. |
| 6,111,573 A | | 8/2000 | McComb et al. |
| 6,167,405 A | | 12/2000 | Rosensteel, Jr. et al. |
| 6,169,534 B1 | | 1/2001 | Raffel et al. |
| 6,182,127 B1 | | 1/2001 | Cronin, III et al. |
| 6,185,582 B1 | | 2/2001 | Zellweger et al. |
| 6,195,794 B1 | | 2/2001 | Buxton |

(56) References Cited

U.S. PATENT DOCUMENTS

| | | |
|---|---|---|
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin, III et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,916,157 B1 | 3/2011 | Kelley et al. |
| 7,921,360 B1 | 4/2011 | Sundermeyer et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater, Jr. |
| 8,635,520 B2 | 1/2014 | Christiansen et al. |
| 8,677,448 B1 | 3/2014 | Kauffman et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,811,676 B1 | 11/2017 | Gauvin |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,078,668 B1 | 9/2018 | Woodrow et al. |
| 10,169,306 B2 | 1/2019 | O'Shaughnessy et al. |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,318,624 B1 | 6/2019 | Rosner et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,505,825 B1 | 12/2019 | Bettaiah et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,546,001 B1 | 1/2020 | Nguyen et al. |
| 10,564,622 B1 | 2/2020 | Dean et al. |
| 10,573,407 B2 | 2/2020 | Ginsburg |
| 10,579,724 B2 | 3/2020 | Campbell et al. |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,733,256 B2 | 8/2020 | Fickenscher et al. |
| 10,740,117 B2 | 8/2020 | Ording et al. |
| 10,747,950 B2 | 8/2020 | Dang et al. |

(56) References Cited

U.S. PATENT DOCUMENTS

| | | |
|---|---|---|
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,010,371 B1 | 5/2021 | Slomka et al. |
| 11,030,259 B2 | 6/2021 | Mullins et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,222,167 B2 | 1/2022 | Gehrmann et al. |
| 11,243,688 B1 | 2/2022 | Remy et al. |
| 2001/0008998 A1 | 7/2001 | Tamaki et al. |
| 2001/0032248 A1 | 10/2001 | Krafchin |
| 2001/0039551 A1 | 11/2001 | Saito et al. |
| 2002/0002459 A1 | 1/2002 | Lewis et al. |
| 2002/0065849 A1 | 5/2002 | Ferguson et al. |
| 2002/0065880 A1 | 5/2002 | Hasegawa et al. |
| 2002/0069207 A1 | 6/2002 | Alexander et al. |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0101416 A1 | 5/2003 | McInnes et al. |
| 2003/0135558 A1 | 7/2003 | Bellotti et al. |
| 2003/0137536 A1 | 7/2003 | Hugh |
| 2003/0187864 A1 | 10/2003 | McGoveran |
| 2003/0200215 A1 | 10/2003 | Chen et al. |
| 2003/0204490 A1 | 10/2003 | Kasriel |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0139400 A1 | 7/2004 | Allam et al. |
| 2004/0162833 A1 | 8/2004 | Jones et al. |
| 2004/0172592 A1 | 9/2004 | Collie et al. |
| 2004/0212615 A1 | 10/2004 | Uthe |
| 2004/0215443 A1 | 10/2004 | Hatton |
| 2004/0230940 A1 | 11/2004 | Cooper et al. |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0063615 A1 | 3/2005 | Siegel et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0091596 A1 | 4/2005 | Anthony et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0216830 A1 | 9/2005 | Turner et al. |
| 2005/0228250 A1 | 10/2005 | Bitter et al. |
| 2005/0251021 A1 | 11/2005 | Kaufman et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0013462 A1 | 1/2006 | Sadikali |
| 2006/0015499 A1 | 1/2006 | Clissold et al. |
| 2006/0015806 A1 | 1/2006 | Wallace |
| 2006/0031148 A1 | 2/2006 | O'Dell et al. |
| 2006/0036568 A1 | 2/2006 | Moore et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |

(56) References Cited

U.S. PATENT DOCUMENTS

| | | |
|---|---|---|
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0248710 A1 | 10/2009 | McCormack et al. |
| 2009/0271696 A1 | 10/2009 | Bailor et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez et al. |
| 2011/0225525 A1 | 9/2011 | Chasman et al. |
| 2011/0231273 A1 | 9/2011 | Buchheit |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233150 A1 | 9/2012 | Naim et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Strick et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Strick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0238363 A1 | 9/2013 | Ohta et al. |
| 2013/0238968 A1 | 9/2013 | Barrus |
| 2013/0246384 A1 | 9/2013 | Victor |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2013/0339051 A1 | 12/2013 | Dobrean |
| 2014/0006326 A1 | 1/2014 | Bazanov |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |

(56) References Cited

U.S. PATENT DOCUMENTS

| | | |
|---|---|---|
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0082525 A1 | 3/2014 | Kass et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0215303 A1 | 7/2014 | Grigorovitch et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0188964 A1 | 7/2015 | Sharma et al. |
| 2015/0212717 A1 | 7/2015 | Nair et al. |
| 2015/0220491 A1 | 8/2015 | Cochrane et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1* | 12/2015 | Gilmour ............... G06F 16/168 705/7.15 |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0321604 A1 | 11/2016 | Imaeda et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0344828 A1 | 11/2016 | Hausler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1* | 3/2017 | Firoozbakhsh ........ G06Q 20/10 |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1* | 4/2017 | Doshi .................. G06F 19/00 |
| 2017/0111327 A1 | 4/2017 | Wu |
| 2017/0116552 A1* | 4/2017 | Deodhar .......... G06Q 10/06316 |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1* | 5/2017 | Kedzlie ............. G06Q 30/0226 |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177888 A1 | 6/2017 | Arora et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0220813 A1 | 8/2017 | Mullins et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0301039 A1* | 10/2017 | Dyer ............. G06Q 10/063114 |
| 2017/0315683 A1 | 11/2017 | Boucher et al. |
| 2017/0315974 A1 | 11/2017 | Kong et al. |
| 2017/0315979 A1 | 11/2017 | Boucher et al. |

(56) References Cited

U.S. PATENT DOCUMENTS

| | | |
|---|---|---|
| 2017/0324692 A1 | 11/2017 | Zhou |
| 2017/0351252 A1 | 12/2017 | Kleifges et al. |
| 2017/0372442 A1 | 12/2017 | Mejias |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0055434 A1* | 3/2018 | Cheung .................. G09B 19/00 |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0012342 A1 | 1/2019 | Cohn |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0123924 A1 | 4/2019 | Embiricos et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019595 A1 | 1/2020 | Azua |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0192785 A1 | 6/2020 | Chen |
| 2020/0247661 A1* | 8/2020 | Rao .................. G05B 19/41875 |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0264220 A1 | 8/2021 | Wei et al. |
| 2021/0326519 A1 | 10/2021 | Lin et al. |
| 2021/0342785 A1 | 11/2021 | Mann et al. |
| 2022/0221591 A1 | 7/2022 | Smith et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 112929172 A | 6/2021 |
| EP | 3 443 466 B1 | 12/2021 |
| KR | 20150100760 | 9/2015 |
| WO | WO 2004/100015 A2 | 11/2004 |
| WO | WO 2006/116580 A2 | 11/2006 |
| WO | WO 2008109541 A1 | 9/2008 |
| WO | WO 2017202159 A1 | 11/2017 |
| WO | WO 2020/187408 A1 | 9/2020 |
| WO | WO 2021096944 A1 | 5/2021 |

(56) References Cited

FOREIGN PATENT DOCUMENTS

| | | |
|---|---|---|
| WO | WO 2021144656 A1 | 7/2021 |
| WO | WO 2021161104 A1 | 8/2021 |

OTHER PUBLICATIONS

Edward A. Stohr, Workflow Automation: Overview and Research Issues, 2001, Information Systems Frontiers 3:3, pp. 281-296 (Year: 2001).
International Search Report and Written Opinion of the International Searching Authority in PCT/IB2020/000658, dated Nov. 11, 2020 (12 pages).
International Search Report and Written Opinion of the International Search Authority in PCT/IB2021/000024, dated May 3, 2021 (13 pages).
International Search Report in PCT/IB2021/000090 dated Jul. 27, 2021.
International Search Report in PCT/IB2020/000974, dated May 3, 2021 (19 pages).
"Pivot table—Wikipedia"; URL: https://en.wikepedia.org/w/index.php?title=Pivot_table&oldid=857163289, originally retrieve on Oct. 23, 2019; retrieved on Jul. 16, 2021.
Rodrigo et al., Project Management with Monday.com: a 101 Introduction; Jul. 22, 2019, pp. 1-21, 2019.
ShowMyPC, "Switch Presenter While Using ShowMyPC"; web archive.org; Aug. 20, 2016.
Vishal Singh, "A Theoretical Framework of a BIM-based Multi-Disciplinary Collaboration Platform", Nov. 5, 2010, Automation in Construction, 20 (2011), pp. 134-144 (Year: 2011).
U.S. Appl. No. 17/143,603, filed Jan. 7, 2021.
U.S. Appl. No. 17/143,768, filed Jan. 7, 2021.
U.S. Appl. No. 17/143,897, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.
U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/242,452, filed Apr. 28, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,803, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).
International Search Report and Written Opinion of the International Search Authority in PCT/IB2021/000297, dated Oct. 12, 2021 (20 pages).
Dapulse.com "features" .extracted from web.archive.or/web/20140918184211/https://dapulse.com/features; Sep. 2014 (Year: 2014).
Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.
Anupam, V., et al., "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999).
Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).
Barai, S., et al., "Image Annotation System Using Visual and Textual Features", In: Proceedings of the 16th International Conference on Distributed Multi-media Systems, pp. 289-296 (2010).
Beate List, "An Evaluation of Conceptual Business Process Modelling Languages", 2006, SAC'06, Apr. 23-27, pp. 1532-1539 (Year: 2006).
"demonstracion en espanol de Monday.com", published Feb. 20, 2019. https://www.youtube.com/watch?v=z0qydTgof1A (Year: 2019).
Desmedt, Yvo, and Arash Shaghaghi, "Function-Based Access Control (FBAC) From Access Control Matrix to Access Control Tensor." In Proceedings of the 8th ACM CCS International Workshop on Managing Insider Security Threats, pp. 89-92. (2016).
Gutwin, C. et al., "Supporting Informal Collaboration in Shared-Workspace Groupware", J. Univers. Comput. Sci., 14(9), 1411-1434 (2008).
Kollmann, Franz, "Realizing Fine-Granular Read and Write Rights on Tree Structured Documents." in the Second International Conference on Availability, Reliability and Security (ARES'07), pp. 517-523. IEEE, 2007. (Year: 2007).
Pedersen et al., "Tivoli: an electronic whiteboard for informal workgroup meetings", Conference on Human Factors in Computing Systems: Proceedings of the INTERACT '93 and CHI '93 conference on Human factors in computing systems; Apr. 24-29, 1993:391-398. (Year 1993).
Peltier, "Clustered and Stacked Column and Bar Charts", Aug. 2011, Peltier Technical Services, Inc., pp. 1-128; (Year: 2011).

\* cited by examiner

FIG. 5

500 — Project

| Project | Person | Due Date | Status |
|---|---|---|---|
| Task A | @ | Apr 1 | Working on it |
| Task B | @ | Feb 11 | Done |
| Task C | @ | Jan 29 | Outstanding |
| + Add | | | |

510 — Medication

| Medication | Person | Schedule | Today's Date |
|---|---|---|---|
| Simvastatin | @ | Mon, Wed, Fri | Wednesday |
| Lisinopril | @ | Mon | Wednesday |
| Omeprazole | @ | Every Day | Wednesday |
| + Add | | | |

520 — Product

| Product | Person | Threshold | Sales |
|---|---|---|---|
| T-shirts | @ | 40,000 | 35,203 |
| Jeans | @ | 12,000 | 12,119 |
| Belts | @ | 10,000 | 6,772 |
| + Add | | | |

FIG. 10A

| Project 1 | Person | Task Details | Status | Due Date | Timeline |
|---|---|---|---|---|---|
| Task 1 | Person 1 | | In Progress | June 30 | Jun 17 – Jul 4 |
| Task 2 | Person 2 | | Done | July 31 | Jun 1 – Jul 31 |
| Task 3 | Person 3 | | Done | May 28 | May 6 – Jul 25 |

FIG. 10B

| File Name | Extension | Identification | Range | Location |
|---|---|---|---|---|
| Single Clap (1-5) | mp3 | 1216827494 | 1-5 | www.website.com/.../single-clap.mp3 |
| Small Group Clap (6-9) | wav | 4278110952 | 6-9 | www.website.com/sndclap.wav |
| Medium Group Clap (10-20) | wav | 867530999 | 10-20 | www.website.com/mdclap.wav |
| Large Group Clap (21-40) | wav | 403987632 | 21-40 | www.website.com/lrgclap.wav |
| Group Cheer (41-) | mp4 | 49836733 | 41- | C:\...crowd-cheer.mp4 |

FIG. 13

DIGITAL PROCESSING SYSTEMS AND METHODS FOR DIGITAL WORKFLOW SYSTEM DISPENSING PHYSICAL REWARD IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Some embodiments of the present disclosure provide unconventional approaches to rewarding accomplishments, which may lead to heightened employee morale and satisfaction. Some such disclosed embodiments integrate reward dispensation within a workflow management system, permitting reward rules to be established and rewards to be dispensed upon achievement of accomplishments. Some disclosed embodiments may involve systems, methods, and computer readable media relating to a digital workflow system for providing physical rewards from disbursed networked dispensers. These embodiments may involve at least one processor configured to maintain and cause to be displayed a workflow table having rows, columns and cells at intersections of rows and columns; track a workflow milestone via a designated cell, the designated cell being configured to maintain data indicating that the workflow milestone is reached; access a data structure that stores a rule containing a condition associated with the designated cell, wherein the at least one rule contains a conditional trigger associated with at least one remotely located dispenser; receive an input via the designated cell; access the rule to compare the input with the condition and to determine a match; and following determination of the match, activate the conditional trigger to cause at least one dispensing signal to be transmitted over a network to the at least one remotely located dispenser in order to activate the at least one remotely located dispenser and thereby cause the at least one remotely located dispenser to dispense a physical item as a result of the milestone being reached.

Systems, methods, and computer readable media for implementing a digital audio simulation system based on non-audio input are disclosed. Systems, methods, devices, and non-transitory computer readable media may include at least one processor configured to receive over a network, during a presentation, from a plurality of network access devices, a plurality of non-audio signals corresponding to activations of substitute audio buttons, each of the plurality of non-audio signals having an audio identity. The at least one processor may be configured to process the received plurality of non-audio signals to determine a quantity of non-audio signals corresponding to a specific audio identity. Disclosed embodiments may also involve a lookup in an audio-related data structure to select at least one particular audio file associated with the audio identity and the determined quantity, to output data for causing the at least one particular audio file to be played.

BRIEF DESCRIPTION OF THE DRAWINGS

FIG. 5 illustrates multiple examples of workflow tables containing designated cells, consistent with some embodiments of the present disclosure.

FIGS. 10A and 10B illustrate exemplary workflow boards for use with an audio simulation system, consistent with some embodiments of the present disclosure.

FIG. 13 illustrates an exemplary data structure, consistent with some embodiments of the present disclosure.

DETAILED DESCRIPTION

Figure 1:
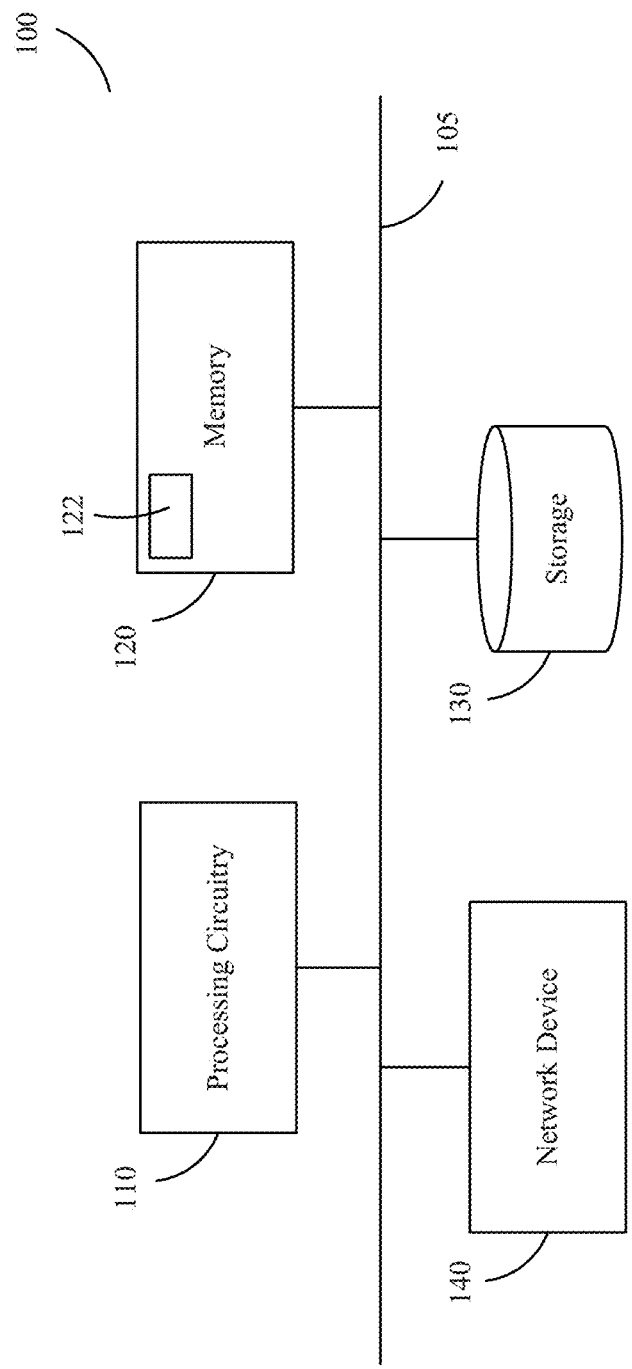
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLU- ETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underlie the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
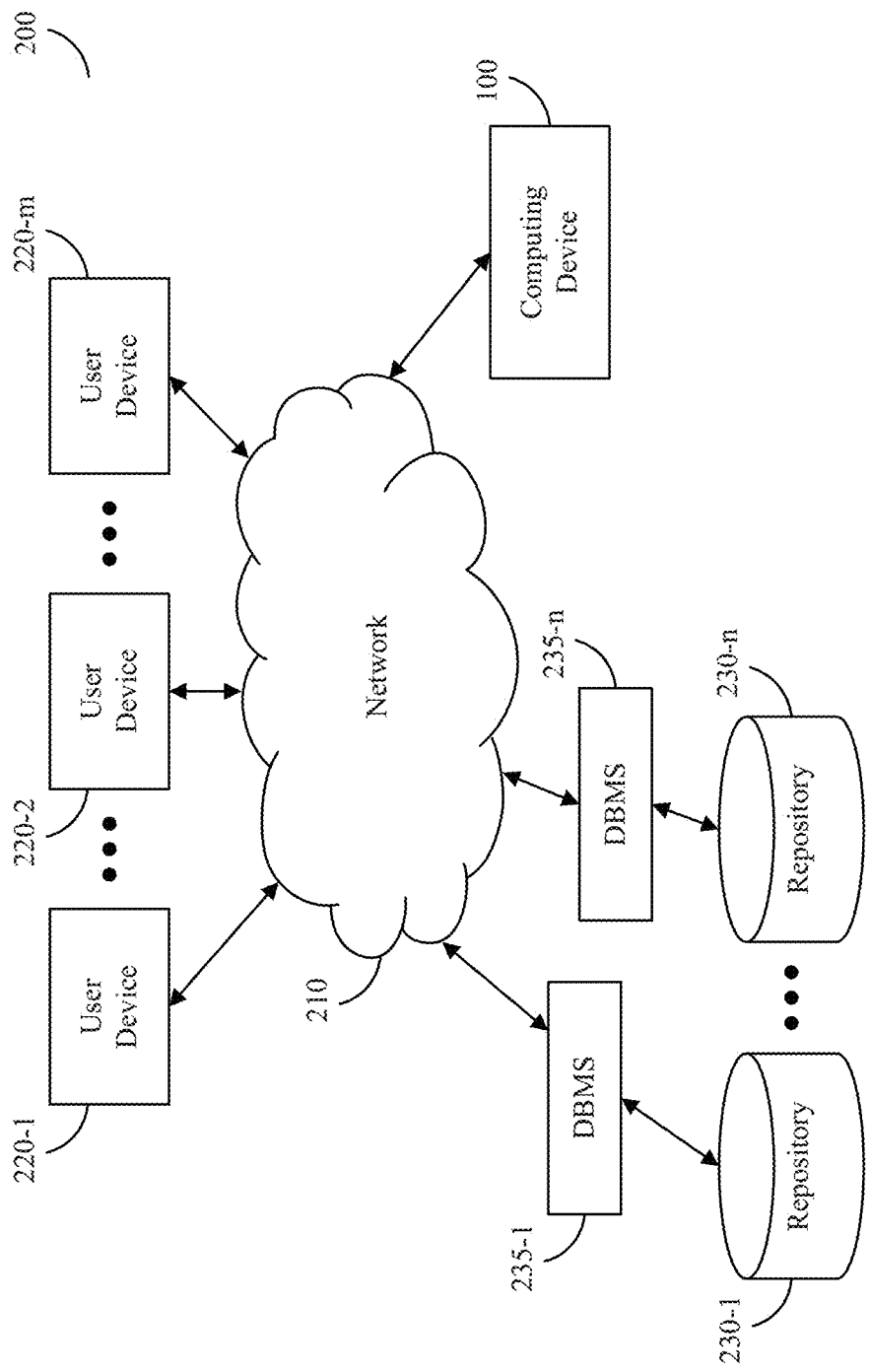
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

As greater numbers of employees either work from home or work in other locations remote from supervisors, acknowledging accomplishments can be more difficult. Even when employees work in a common space, ensuring that employees are recognized for accomplishments can be difficult, particularly when large groups of individuals each with many milestones, targets, or goals are managed by a single supervisor or a small group of supervisors. In such situations, accomplishments may be inadvertently overlooked. Regardless of size of a working group and its location, acknowledgements of accomplishments are typically left to the whim of supervisors who may be too busy or otherwise distracted to acknowledge an accomplishment.

Accordingly, there is an unmet need for ensuring that employees are consistently rewarded for accomplishments, such as reaching target or goals, regardless of whether employees are working remotely or in an office setting. The present disclosure provides unconventional ways of providing such recognition, using a workflow management system that triggers the dispensation of physical rewards when the system detects to accomplishment of a target, milestone, or goal. Conventional approaches tend to be overly reliant on human interaction where recognition for accomplishments may be inconsistent.

As a result, there is a need for unconventional approaches to enable entities to automate the dispensing of physical items as a result of milestones being reached through the techniques disclosed herein involving a workflow table, tracking workflow milestones via designated cells, accessing data structures that store at least one rule containing a condition associated with the designated cell, accessing the at least one rule to compare an input with the condition to determine a match, and activating a conditional trigger to cause a dispensing signal to be transmitted to at least one remotely located dispenser to thereby cause a physical item to be dispensed as a result of a milestone being reached.

Aspects of this disclosure may provide a technical solution to the challenging technical problem of project management and may relate to a digital workflow system for providing physical rewards from disbursed networked dispensers, the system having at least one processor, such as the various processors, processing circuitry or other processing structure described herein. Such solutions may be employed in collaborative work systems, including methods, systems, devices, and computer-readable media. For ease of discussion references below to system, methods or computer readable media apply equally to all. For example, the discussion of functionality provided in a system, is to be considered a disclosure of the same or similar functionality in a method or computer readable media. For example, some aspects may be implemented by a computing device or software running thereon. The computing device may include at least one processor (e.g., a CPU, GPU, DSP, FPGA, ASIC, or any circuitry for performing logical operations on input data), as discussed previously, to perform example operations and methods. Other aspects of such methods may be implemented over a network (e.g., a wired network, a wireless network, or both).

As another example, some aspects may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities but rather may be accomplished using many different instrumentalities.

Aspects of this disclosure may be related to digital workflow, which in one sense refers to a series of tasks or sub-functions electronically monitored, and collectively directed to completing an operation. In other senses, a digital workflow may involve an orchestrated and repeatable combination of tasks, data (e.g., columns, rows, boards, dashboards, solutions), activities, or guidelines that make up a process. By way of example, a digital workflow system may utilize workflow management software that enables members of a team to cooperate via a common online platform (e.g., a website) by providing interconnected boards and communication integrations embedded in each of the interconnected boards. In an exemplary digital workflow system, the system may provide automatic updates to a common dashboard that is shared among multiple client devices, and provide varying visualizations of information to enable teams to understand their performance and milestones. Providing physical rewards as may refer to any process for delivering tangible items to an entity. In this context, a physical reward may be any item having material existence which may be delivered to one or more people, animals, organizations, or other entities which may receive an item. Physical rewards or physical items are not limited by size, shape, or form, and may include food, drinks, gifts, gift cards, gadgets, vehicles, medication, tools, clothing, live animals, data storage apparatuses, keys to access another physical object (e.g., physical keys or access codes printed on a card), plants, packages, furniture, appliances, office supplies, or any other tangible items which may be provided to an entity.

Disbursed networked dispensers may refer to one or more machines or containers that may be configured to release an amount (e.g., a volume of a liquid or solids) or a specific item at a specified time or when prompted, simultaneously or at designated times for each dispenser. The machines or containers may be connected to each other (e.g., wired or wirelessly) and placed at locations different from each other. In some embodiments, the disbursed networked dispensers may be configured to move or be moved from one location to another. For example, a dispenser may be mounted on or part of a drone, a vehicle, a train, a robot or any other apparatus which would allow a dispenser to move from one location to another. In other embodiments, a dispenser may be a continuous belt or chain made of fabric, rubber, metal, or another appropriate material, which may be used for moving physical rewards from one location to another. For example, a dispenser may include a conveyor belt which may move a physical reward from a centralized location to a specific location associated with a receiving entity. Additionally, a dispenser may include a robot arm or picker which may autonomously retrieve and transport physical items. In other embodiments, a dispenser may be an apparatus configured to dispense the physical reward by launching it at an entity (e.g., a catapult, cannon, or a slingshot) or by delivering a physical reward via a track which may lead the physical reward to a receiving entity. In yet another embodiment, a dispenser may include a mechanism for striking the physical reward upon delivery thereof. For example, the dispenser may include a hammer which smashes the physical reward, e.g., a cookie, as it is delivered to an entity. In another example, the dispenser may strike a container of the physical reward to release the physical reward, such as striking a tube to release confetti, or striking a balloon to reveal the physical reward contained inside the balloon. In some embodiments, the disbursed networked dispensers may include one or more lights, speakers, or any apparatuses capable of transmitting an alert or message to an entity. Additionally, the dispensers may be connected in such way that when one of the disbursed networked dispensers dispenses a physical reward, the other dispensers in the network may become "aware" of this and may transmit an alert, dispense a physical reward of their own, or execute any other appropriate response to a sibling dispenser dispensing a reward.

Figure 3:
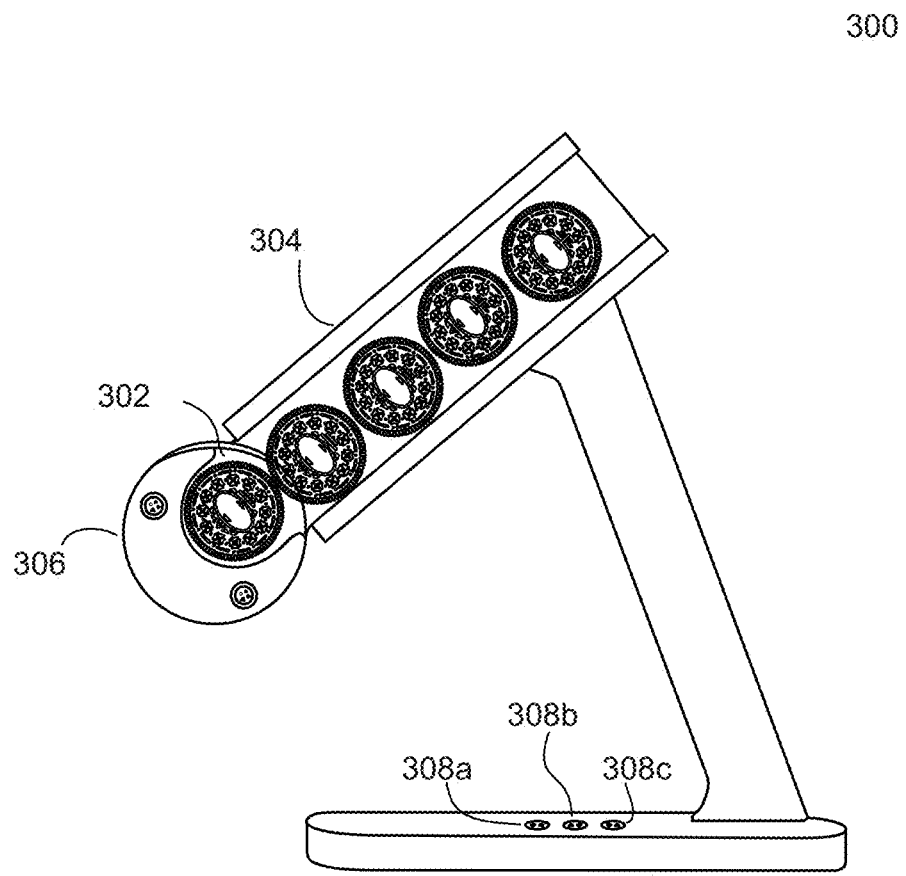
FIG. 3 illustrates an exemplary disbursed networked dispenser for dispensing cookies, consistent with some embodiments of the present disclosure.
Figure 4B:
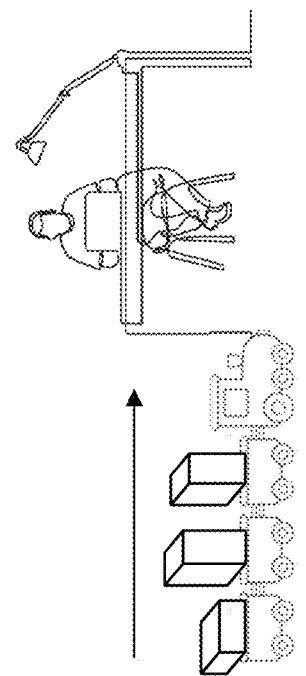
FIGS. 4A to 4D illustrate exemplary embodiments of various disbursed networked dispensers for dispensing physical rewards, consistent with some embodiments of the present disclosure.
Figure 4D:
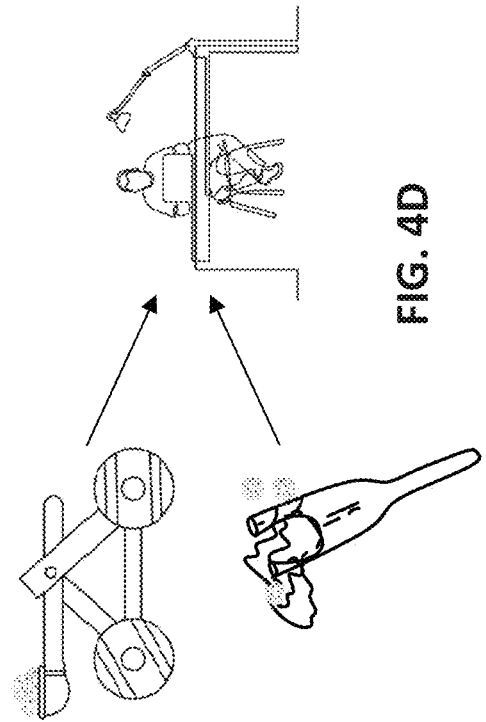
Figure 4A:
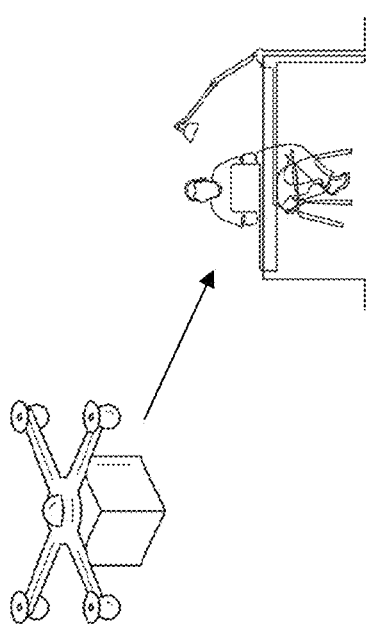
Figure 4C:
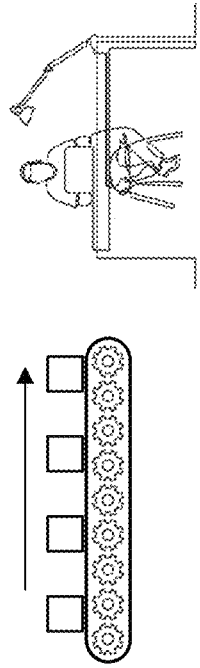

By way of example, FIG. 3 illustrates one example of a disbursed networked dispenser 300 for dispensing physical rewards (e.g., cookies). Other examples of disbursed networked dispensers are shown in FIGS. 4A to 4D, ranging from flying drones, driving robots, conveyor belt systems, and launching mechanisms. By way of a few examples, a physical item may be dispensed by means of a flying drone, as illustrated in FIG. 4A; a remote control or autonomous train as in FIG. 4B; a conveyor belt, as illustrated in in FIG. 4C; or a catapult, cannon or slingshot, as illustrated in FIG. 4D. Any other mechanism capable of delivering a reward may also be used consistent with this disclosure. Each of these mechanisms may be connected to a digital workflow system to enable delivery of a physical reward in response to a condition being met in the digital workflow system (e.g., a task being marked complete, a milestone reached, a goal met, a delivery being marked ready for delivery, or any other condition).

Disclosed embodiments may involve maintaining and causing to be displayed a workflow table having rows, columns, and cells at intersections of rows and columns. A workflow table may refer to an arrangement of data presented in horizontal and vertical rows (e.g., horizontal rows and vertical columns) relating to a process, task, assignment, engagement, project, endeavor, procedure item to be managed, or any other undertaking that involves multiple steps or components. The workflow table may include items defining objects or entities that may be managed in a platform, the objects or entities presented in rows and columns defining cells in which data is contained, as described in greater detail herein. Maintaining the workflow table may refer to storing or otherwise retaining the workflow table and/or its underlying data. For example, the workflow table may be kept in an existing or operating state in a repository containing a data structure located locally or remotely. Additionally or alternatively, maintaining the workflow table may refer to modifying the workflow table to correct faults, to improve performance, functionality, capabilities, or other attributes, to optimize, to delete obsolete capabilities, and/or to change the workflow in any other way once it is already in operation. Causing the workflow table to be displayed may refer to outputting one or more signals configured to result in presentation of the workflow table on a screen, other surface, or in a virtual space. This may occur, for example, on one or more of a touchscreen, monitor, AR or VR display, or any other means as previously discussed and discussed below. A table may be presented, for example, via a display screen associated with a computing device such as a PC, laptop, tablet, projector, cell phone, or personal wearable device. A table may also be presented virtually through AR or VR glasses, or through a holographic display. Other mechanisms of presenting may also be used to enable a user to visually comprehend the presented information. In some embodiments, rows may be horizontal or vertical, and columns may be vertical or horizontal, and every intersection of a row and a column may define a cell.

As an illustrative example, FIG. 5 depicts workflow tables 500, 510, and 520 including rows 502a to 502c (Task A, Task B, and Task C); row 512a to 512c (Simvastatin, Lisinopril, and Omeprazole); and rows 522a to 522c (T-shirts, Jeans, and Belts). The workflow tables of FIG. 5 also include columns 504a to 504d (Project, Person, Due Date, and Status); columns 514a to 514d (Medication, Person, Schedule, and Today's Date); and columns 524a to 524d (Product, Person, Threshold, and Sales). Designated cells are located at intersections of rows and columns. For example, designated cells 506a to 506c appear at the intersections of the rows and status column in workflow table 500; designated cells 516a to 516c appear at the intersections of the rows and "Today's Date" column in workflow table 510; and designated cells 526a to 526c appear at the intersections of the rows and Sales column in workflow table 520. Similarly, each of the tables in FIG. 5 include a Person column designating, for example, persons 508, 518, and 528a to 538c. Designated Status cells 506a to 506c are at the intersections of each row and the Status column. As discussed later in greater detail, logical (conditional) rules may trigger actions when conditions are met in specified cells.

Some disclosed embodiments may involve tracking a workflow milestone via a designated cell, the designated cell being configured to maintain data indicating that the workflow milestone is reached. To track a workflow milestone via a designated cell may include monitoring a cell of a workflow table to determine whether an action or event (e.g., marking a change or stage in development) has occurred (e.g., as reflected in a value in a cell or as reflected in a combination of cells). The action or event may be automatically updated in response to a change in the system, or may occur as a result of a manual change provided by input from a client device. A workflow milestone may be any goal set by the system or by a user to indicate progress made in relation to a project, property, item, or any other workflow being tracked. For example, a workflow milestone may be associated with a progress or completion of a task, a deadline, a status, a date and/or time (e.g., every Wednesday or every day at 2:00 pm); a threshold; an event (e.g., a new sale); a received input (e.g., the press of a button, data entered into a form, or a received donation to a charity); a received input from a specific entity (e.g., receiving an email from your boss or gaining a new follower on social media); a detection by a sensor (e.g., a camera capturing a passing dog; a microphone detecting a passphrase such as "give me a cookie"); an evaluation made by a processor (e.g., a number of hours worked by an entity or a number of projects completed); a combination of one or more data points (e.g., a milestone being marked as completed before a certain date) or any other event which may serve as a milestone. In response to the milestone being reached, the system may trigger an action for dispensing a physical reward. A designated cell being configured to maintain data indicating that the workflow milestone is reached. The designated cell may be any cell of the workflow table that is pre-designated as milestone-related. The cell may be, for example, a status cell indicating that an item is complete. The designated cell may be one of a combination of cells for designating a milestone is reached. For example, a milestone may only be considered reached if both a status cell contains a certain value and a date cell contains a certain value. The designated cell may be updated by automatic or manual means as discussed above. For example, the designated cell may be updated automatically by a processor, manually by a user, by a third-party system, or by any other entity which may modify the designated cell. For example, the system may determine that a status is reached by assessing data entered in a group of cells. Or, the system may determine a status when a user makes a corresponding entry in a status cell.

For example, FIG. 5 depicts status cells 506a to 506c. The designated cells may be tracked to determine when a workflow milestone is reached. For example, designated cells 506a to 506c may be tracked to determine whether a project is completed. In this example, Tasks B and C may be completed since designated cell 506b contains the value "Done". Therefore, if the workflow milestone is project completion, for task B the workflow milestone is attained. Additionally or alternatively, the workflow milestone may be a date and may designate multiple cells for monitoring. For example the designated cells for monitoring may include a due date and a status. In FIG. 5, if on April 2, Task A's status cell 506a still reads "Working on it," a workflow milestone may not be reached (i.e., the due date was missed set by Due Date cell 507a).

As another example, the workflow milestone may be a recurring date, such as with workflow table 510. Here, a person 518 associated with medications "Simvastatin," may be scheduled to take Simvastatin on Mondays, Wednesdays, and Fridays; while person 514b is scheduled to take Omeprazole every day of the week. In this example, since designated cells 516a to 516c read "Wednesday," the system will determine a workflow milestone will have been reached for "Simvastatin" and "Omeprazole."

As yet another example, the workflow milestone may be a threshold, such as with workflow table 520. Here, a person 528a may be associated with "T-shirts," a person 528b may be associated with "Jeans," and a person 528c may be associated with "Belts." A workflow milestone may be reached when T-shirt sales reach 40,000, when "Jeans" sales reach 12,000, and when belt sales reach 10,000. In this example, the "Jeans" sales provided via designated cell 526b show that "Jeans" sales have surpassed the threshold, therefore the workflow milestone is attained.

Some disclosed embodiments may involve accessing a data structure that stores at least one rule containing a condition associated with the designated cell, wherein the at least one rule contains a conditional trigger associated with at least one remotely located dispenser. A data structure may refer to a database or other system for organizing, managing, and storing a collection of data and relationships among them, such as through a local or remote repository. A rule may refer to a logical sentence structure that may trigger an action in response to a condition being met in the workflow table, as described in greater detail herein. In some embodiments, the rule may be an automation that associates the designated cell with the condition and an entity. A condition may refer to a specific status or state of information that may relate to a particular cell, such as a designated cell for monitoring. The designated cell may contain status information (e.g., status is "working on it") that may be changed to a different status (e.g., status is "done"), which may be the condition required to trigger an action associated with one or more remotely located dispensers. A status may refer to a mode or form a designated cell may take. For example, the status for a designated cell may be "In Progress" or "Completed." A conditional trigger may refer to specific conditions that must be met in order to cause an activation of a dispenser. For example, a rule may be "when X task is completed, dispense a cookie." Here, the condition may be "when X task is completed," and the conditional trigger may be the transmission of a signal to dispense a cookie when the condition is met. The at least one remotely located dispenser associated with the conditional trigger may refer to any device configured to dispense a reward or a physical item. The dispenser may be considered remote in that the processor that originates the dispensing signal is not within the dispenser. The dispensers may receive signals from a triggering processor through a network, directly through a cable, or by any other means. In some embodiments, the at least one remotely located dispenser may be located remote from the at least one processor. Being located remotely may include any measure of physical distance between the dispenser and the at least one processor that determines that the conditional trigger is met. For example, the dispenser and the at least one processor may be remotely located from each other in the same room. In other examples, the dispenser and the at least one processor may be in different buildings, different cities, different states, or even in different countries. In any situation, the at least one remotely located dispenser may be associated with a conditional trigger and activated in response to a condition being met in a digital workflow, even if the dispenser is located remotely from the at least one processor that monitors the digital workflow.

Figure 6:
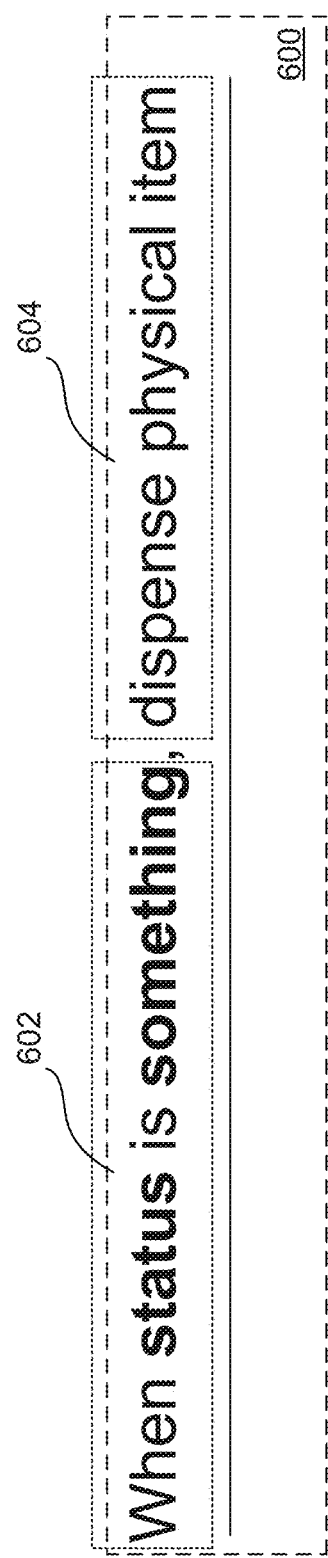
FIG. 6 illustrates an exemplary rule containing a condition and a conditional trigger, consistent with some embodiments of the present disclosure.

As an illustrative example, FIG. 6 depicts an exemplary rule 600 containing a condition 602 and a conditional trigger 604. Here, condition 602 is "When status is something." Condition 602 may be modified by an entity associated with the designated cell and a workflow milestone. For example, condition 602 may read "When date/time is Monday at 2:00 pm," "When T-shirt sales are 40,000," "When a new social media follower is gained," "When camera detects somebody at the door," etc. In this example, conditional trigger 604 is "dispense physical item." Conditional trigger 604 may also be modified by an entity, for example, to specify where to dispense a physical item, which entity to dispense the physical item to, when to dispense the physical item, and how to dispense the physical item. For example, modified conditional trigger 604 could read "dispense fertilizer to onion field via drone." A modified rule 600 may be simple, such as "when project X is "done," dispense cookie to Janet," or complex, such as "when timer reaches 10 seconds, dispense a tennis ball to Rafael Nadal via tennis ball launcher on court 4."

As another example, dispenser 300 of FIG. 3 may be remotely located from the at least one processor. In an example, dispenser 300 may be located in the USPTO headquarters in Alexandria, Va., while the at least one processor may be located in Tel Aviv, Israel. The at least one processor in Israel may maintain a workflow table associated with an Examiner from the USPTO, and in response to the Examiner reaching a milestone, for example, allowing this application, the at least one processor may send a dispensing signal to dispenser 300 to dispense part of its contents, for example, confetti or cookies.

Some disclosed embodiments may involve receiving an input via a designated cell. This may refer to the at least one processor receiving a command or signal through the designated cell as a result of information input into the designated cell or as a result of a change in information that is contained in the designated cell. The input may be provided through any interface such as a mouse, keyboard, touchscreen, microphone, webcam, softcam, touchpad, trackpad, image scanner, trackball, or any other input device. For example, a user through the user's client device may click on the designated cell to change the status from "In Progress" to "Completed." In some embodiments, receiving the input may occur as a result of an update to the designated cell. For example, an update may include the addition, subtraction, or rearrangement of information in the designated cell. One example of an update is a change in status from "In Progress" to "Done." In other embodiments, the input may be received from a network access device in a vicinity of the at least one remotely located dispenser, and the at least one remotely located dispenser and the network access device may be located remote from the at least one processor. A network access device may include any computing device such as a mobile device, desktop, laptop, tablet, or any other device capable of processing data. A network access device which is in the vicinity of the at least one remotely located dispenser may be in the physical area near or surrounding the at least one remotely located dispenser. For example, a PC user might have a dispenser nearby. When the user updates a status to Done, the update may be detected by a remote processor, triggering a rule that causes the nearby dispenser to provide the user with a physical reward. In yet another embodiment, the at least one processor may be a server and the at least one remotely located dispenser may be connected to the server via a network. A server may be computer hardware or a repository that maintains the data structure that contains the digital workflows of users, as described in greater detail herein. A network may be a group of computing devices which use a set of common communication protocols over digital interconnections for the purpose of sharing resources provided by the devices. Thus, the dispenser may be networked to the server to enable the server to send signals directly to the dispenser. In an alternative arrangement, the dispenser may be connected to a user's device (e.g., PC) and the server might communicate with the dispenser through the user's device.

By way of example, a user may modify designated status cell 506a in table 500 of FIG. 5 to "Done" using a mouse, a keyboard, or any other means. For example, these input devices might be used to make a selection on a drop-down list. As another example, the system itself may automatically update designated date cells 516a to 516c at a determined time every day. Alternatively, the system may receive input from another entity which specifies that a new t-shirt sale has been made, raising the count of designated number cell 526a to 35,204. Yet another example may involve a sensor informing an entity that movement has been detected, and such entity updating a designated cell to reflect this information.

Some disclosed embodiments may include accessing at least one rule to compare an input with a condition and to determine a match. Comparing the input with the condition to determine a match may refer to the at least one processor inspecting both the input received via a designated cell and the condition contained in the rule to determine whether the input and the condition correspond to each other. For example, if the input received via the designated cell reveals that a project X has been completed, and the condition is "when project X is completed," the at least one processor may determine that there is a match. Alternatively, if the input received via the designated cell reveals that project X is still in progress, the at least one processor may determine that there is not a match.

As an illustrative example, the at least one processor may access a rule, associated with designated status cell 506a of table 500 in FIG. 5, which reads "when status is 'Done,' dispense a cookie." The at least one processor may then compare an input (e.g., status was changed from "Working on it" to "Done") with the condition (i.e., "when status is 'Done'") and determine that there is a match since the input shows that the workflow milestone has been reached. As another example, the rule associated with designated status cell 506b may read "when status is 'Done' and due date is not passed, dispense a cookie." In this example, the at least one processor may compare the input (i.e., status was changed from "Working on it" to "Done") with the condition (i.e., "when status is 'Done' and due date is not passed"), with the addition of determining whether the due date has passed, to determine whether there is a match.

Yet another example may involve workflow table 510, where the at least one processor may access a rule associated with designated cell 516b which may read "when today's date is "Monday," dispense Lisinopril." The at least one processor may then compare an input (e.g., today's date was changed from "Tuesday" to "Wednesday") with the condition (i.e., when today's date is "Monday") to determine whether there is a match. In this case, the at least one processor may determine that there is not a match.

In some embodiments, following determination of a match, the at least one processor may be configured to activate a conditional trigger to cause at least one dispensing signal to be transmitted over a network to at least one remotely located dispenser in order to activate the at least one remotely located dispenser and thereby cause the at least one remotely located dispenser to dispense a physical item as a result of the milestone being reached. Activating the conditional trigger may refer to executing the action associated with the at least one remotely located dispenser. Activating the conditional trigger may, in some embodiments, cause at least one dispensing signal to be transmitted over a network to the at least one remotely located dispenser, which may refer to the at least one processor sending a signal to the at least one remotely located dispenser through a network, the signal containing instructions for the at least one remotely located dispenser to dispense a part or all of its contents. Activating the at least one remotely located dispenser may include the at least one remotely located dispenser receiving the dispensing signal to cause the operations of the at least one remotely located dispenser to be activated and carried out. Causing the at least one remotely located dispenser to dispense a physical item may refer to the dispensing signal transmitted to the remotely located dispenser causing the dispenser to disburse a tangible object corresponding to a part of its contents, as described in greater detail herein. A physical item may be dispensed by, for example, rotating or otherwise moving a part of the dispenser, opening a window, picking (e.g., with a robotic arm), pushing, blowing, pulling, suctioning, causing to roll, striking, or any other means of delivering a physical item to an entity, as discussed previously above. Dispensing a physical item as a result of the milestone being reached may refer to dispensing the physical item based on the milestone being complete, as evidenced by the determination of a match, as described in greater detail herein. A physical item may include any tangible object which may be provided to an entity, as described in greater detail herein.

In some embodiments, the at least one remotely located dispenser may be configured to hold a plurality of confections and to dispense a confection in response to the dispensing signal. Confections may include edible rewards such as baked desserts, candy, or any other food item. As a result of receive a dispensing signal, a remotely located dispenser holding confections may then dispense at least one confection. In another example, if the at least one dispenser holds ice cream, in response to receiving a dispensing signal, the dispenser may be configured to dispense a volume of ice cream. The at least one remotely located dispenser may be configured to hold any tangible item which may be provided to an entity, as described in greater detail herein.

In other embodiments, at least one identity of at least one remotely located dispenser includes identities of a plurality of remotely located dispensers, and wherein the at least one dispensing signal includes a plurality of dispensing signals configured to cause, upon activation of the conditional trigger, dispensing by each of the plurality of dispensers. An identity of a remotely located dispenser may refer to an identifier associated with the remotely located dispenser. For example, the identity may be represented as a word (e.g., name), number (e.g., IP address), letter, symbol, or any combination thereof. Causing dispensing by each of the plurality of dispensers based on a plurality of dispensing signals may refer to sending a dispensing signal to a plurality of dispensers to cause them to activate and dispense a physical item in response to the activation of conditional trigger (an action as a result of a condition being met). For example, all of the dispensers in an office may be configured to dispense a physical item whenever the company makes a sale, every day at a specific time, or every time a manager presses a button. Similarly, a group of networked dispensers may be configured to dispense a physical item whenever one of the networked dispensers of the group receives a dispensing signal.

In some embodiments, the at least one rule may contain an identity of at least one entity associated with the at least one remotely located dispenser, and activating the conditional trigger may include looking up an identification of the at least one remotely located dispenser based on the identity of the at least one entity. An identity of an entity may refer to an identifier associated with a specific individual, the identifier being represented by a word, number, letter, symbol, or any combination thereof, as discussed previously. Looking up an identification of the at least one remotely located dispenser based on the identity of the at least one entity may refer to the at least one processor determining which particular dispenser to send a dispensing signal to, based on the entity associated with the conditional trigger. For example, a rule may be associated with a person Y. When the condition of this rule matches an input received via the designated cell, the at least one processor may activate the conditional trigger of the rule, including looking up the identification of a dispenser associated with person Y. In this way, the system may appropriately dispense a physical reward to a particular dispenser associated with a specific entity (e.g., an individual, a team, a specific room).

In other embodiments, the at least one remotely located dispenser may be a vending machine that holds a plurality of differing food items and wherein the at least one signal is configured to dispense a food item in response to the conditional trigger. A vending machine may be an automated machine which provides items such as snacks and beverages to entities after a condition has been met. Additionally or alternatively, a vending machine may hold physical items other than food items, such as gift cards, gadgets, and/or other small tangible items. The at least one remotely located dispenser may also be a centralized dispenser other than a vending machine. For example, a centralized dispenser may resemble an ATM and may dispense cash to an entity. The at least one signal being configured to dispense a food item in response to the conditional trigger may refer to the signal containing instructions for the vending machine to dispense a specific item in response to an activated conditional trigger. For example, depending on the difficulty of a task associated with a conditional trigger, an item of corresponding value may be selected by the at least one processor to be dispensed by the vending machine. In this case, a more difficult task may award an entity an item with a higher value than an easier task. As another example, an entity may choose which physical item they wish to receive from the vending machine or other dispenser type (such as the conveyor belt, drone, etc.). Additionally or alternatively, a rule may be such that different items may be selected for dispensing by the at least one processor depending on the match.

In one example, a rule for Tasks A, B, and C of worktable 500 of FIG. 5 may read "when status is 'done,' dispense one cookie, when status is done two days ahead of schedule, dispense two cookies." In this case, person 508 may receive one cookie for having completed Task B on time, and two cookies for having completed Task B ahead of schedule.

Embodiments may also include the vending machine being configured to withhold dispensing of the food item associated with the conditional trigger until an identity is locally received by the vending machine. Withholding dispensing until an identity is locally received by the vending machine may refer to the vending machine receiving a dispensing signal, but waiting for an additional signal before activating to dispense a physical item. For example, in some instances, the dispensing may be delayed until the recipient is present at the dispenser. For example, an individual may receive a message entitling the individual to an item from a vending machine (e.g., a particular item or a credit to select an item). The dispensing may only occur when the individual approaches and prompts the machine to dispense. The identity of the entity may be confirmed by scanning an ID, facial recognition, inputting a code or ID, two-factor authentication, RFID, NFC, QR code, or any other means of identifying a specific entity. In this way, the vending machine may dispense the physical reward to the correct entity in a situation when multiple entities may also have access to the same vending machine.

By way of example, for a rule associated with designated cell 506a in FIG. 5, which reads "when status is "Done," dispense a cookie," the at least one processor determines a match when the status is updated to "Done." Following the determination of the match, the at least one processor may activate the condition trigger (i.e., dispense a cookie) to cause a dispensing signal to be transmitted over a network to a remotely located dispenser, for example, dispenser 300 of FIG. 3. Receiving the dispensing signal may cause dispenser 300 to become activated and thereby cause dispenser 300 to dispense a cookie as a result of the milestone (i.e., completing task A) being reached. In this example, dispenser 300 may dispense a cookie 302 by having a cookie roll down shaft 304 into rotating motor unit 306, and having rotating motor unit 306 rotate to allow cookie 302 fall while maintaining the rest of the cookies in place in shaft 304. However, other methods for dispensing cookies or other physical items may be employed. Dispenser 300 may be configured to hold a plurality of cookies or other physical items, as shown in shaft 304 of FIG. 3. Dispenser 300 may include an identity, such as a unique ID or some form of identification such that the at least one processor may ensure the dispensing signal is sent to the right dispenser. Dispenser 300 may also include indicators to provide information to a user. For example, dispenser 300 may include indicators 308a to 308c where indicator 308a may indicate whether dispenser 300 is receiving power, indicator 308b may indicate whether dispenser 300 is connected to a network, and indicator 308c may indicate whether another dispenser in the network has dispensed a cookie. Indicators 308a to 308c may also be configured to indicate other information, such as indicating that a cookie is about to be dispensed, dispenser 300 is out of stock, or any other information which may be useful to a user. Additionally, indicators 308a to 308c may include a speaker or some other system which may be used to alert a user.

As described above, the rule may contain an identity of an entity associated with the dispenser. For example, for a dispenser associated with "Janet," the rule may read "when task A is "Done," dispense a cookie to Janet." In this case, activating the conditional trigger may include looking up an identification of the dispenser associated with Janet based on the rule. That is, the at least one processor may determine there is a match and that the conditional trigger specifies that a cookie be dispensed to Janet, and may therefore look up which dispenser is associated with Janet in order to ensure a cookie is being dispensed to her.

Figure 7:
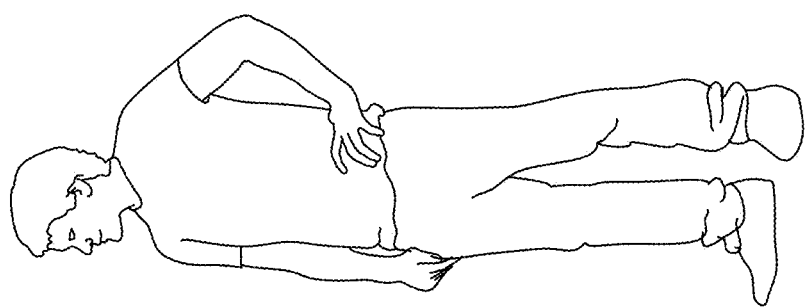
FIG. 7 illustrates an exemplary centralized dispenser for dispensing physical rewards, consistent with some embodiments of the present disclosure.
Figure 7:
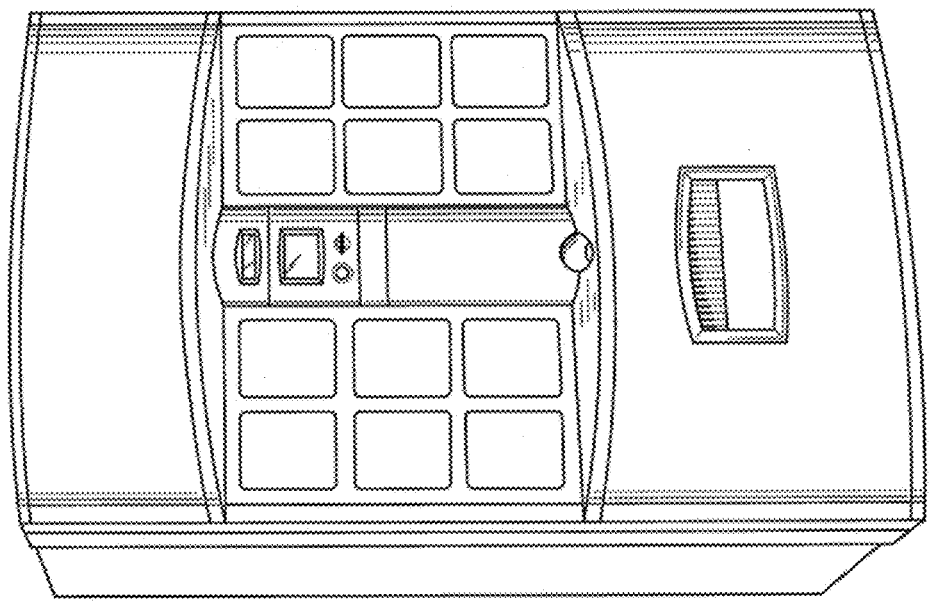

As another example, the remotely located dispenser may be a vending machine 700 that holds a plurality of differing food or other items, as shown in FIG. 7. In this case, the dispensing signal may include additional instructions to dispense the physical item. For example, vending machine 700 may be configured to withhold dispensing of the physical item until an identity of an entity is confirmed by vending machine 700. That is, if Janet completes Task A and a dispensing signal is sent to vending machine 700 to dispense a cookie, vending machine 700 may wait until Janet confirms her identity to vending machine 700. This may be done by scanning an ID, facial recognition, or any other means of identifying a specific entity, as described in greater detail herein. Other instructions to dispense the physical item may include dispensing different items according to a difficulty of a task (e.g., completing easy Task A will reward Janet with a cookie and completing hard Task B will reward Janet with a smartwatch) or even allowing a physical item to be chosen by an entity (e.g., Janet may prefer cereal bars to cookies). The vending machine described above may be similar to other centralized dispensing methods systems described herein, such as the conveyor belt, the drone, or the cookie dispenser as shown in FIGS. 3 and 4A to 4D.

Figure 8:
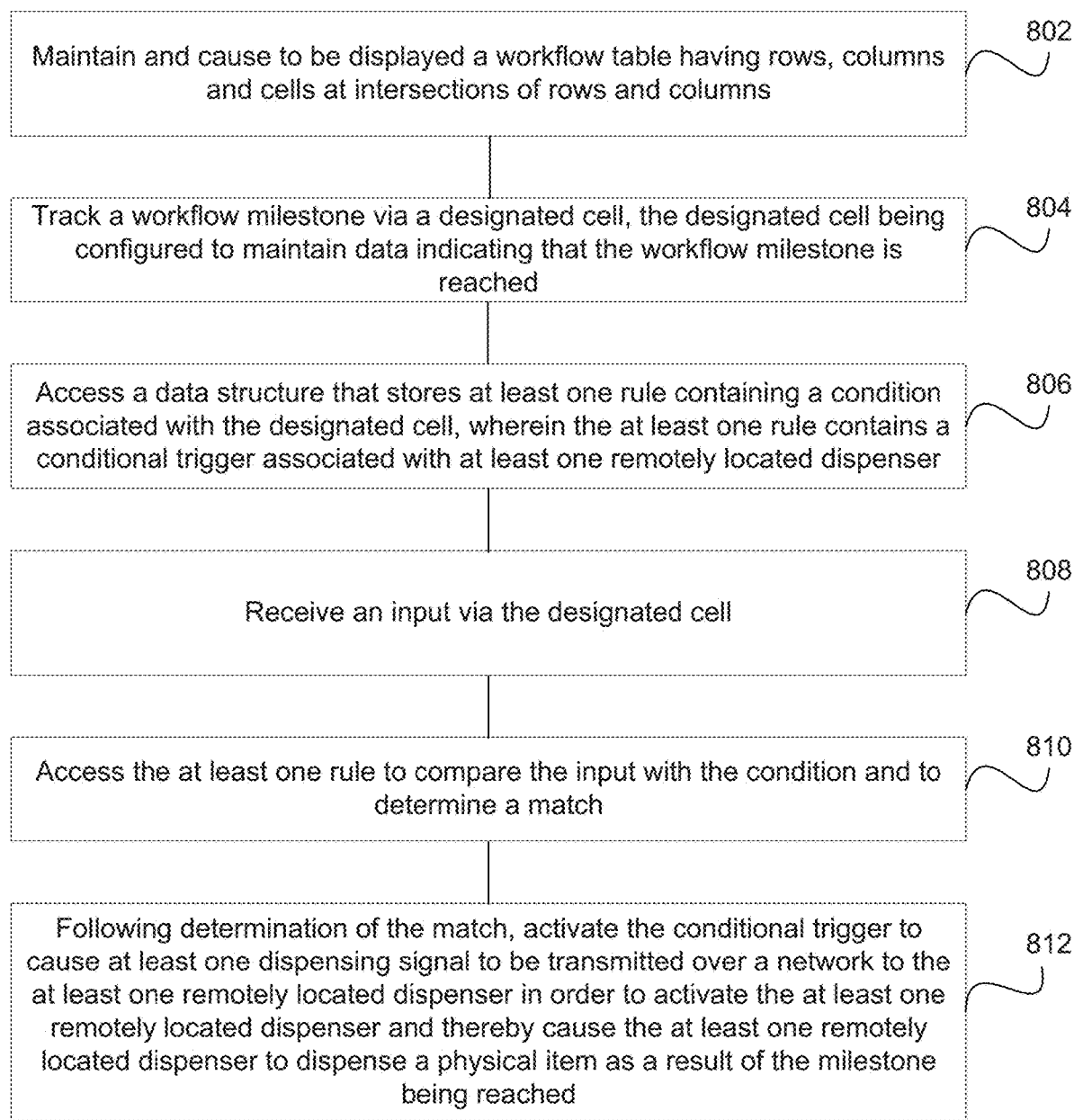
FIG. 8 is a block diagram of an exemplary digital workflow method for providing physical rewards from disbursed networked dispensers, consistent with some embodiments of the present disclosure.

FIG. 8 illustrates an exemplary block diagram of a digital workflow method 800 for providing physical rewards from disbursed networked dispensers. The method may be implemented, for example, using a system including a processor as previously described. To the extent specific details and examples were already discussed previously, they are not repeated with reference to FIG. 8. In this example, at block 802 the processor may maintain and cause to be displayed a workflow table. The workflow table may have rows, columns, and cells at intersections of rows and columns. At block 804, the processor may track a workflow milestone. The workflow milestone may be tracked via a designated cell (or group of cells) configured to maintain data indicating whether a workflow milestone is reached. At block 806, the processor may access a data structure storing at least one rule. The at least one rule may contain a condition associated with the designated cell (or group of cells) and a conditional trigger associated with a remotely located dispenser. At block 808, the processor may receive an input via the designated cell(s). At block 810, the processor may access the at least one rule to determine a match by comparing the input with the condition. At block 812, the processor may activate a conditional trigger. The conditional trigger may be activated following determination of the match and may cause a dispensing signal to be transmitted over a network to the remotely located dispenser. The remotely located dispenser may be activated as a result of receiving the dispensing signal, which may cause the remotely located dispenser to dispense a physical item as a result of the milestone being reached.

Consistent with some disclosed embodiments, systems, methods, and computer readable media for implementing an audio simulation system for providing variable output as a function of disbursed non-audio input are disclosed. The systems and methods described herein may be implemented with the aid of at least one processor or non-transitory computer readable medium, such as a CPU, FPGA, ASIC, or any other processing structure(s), as described above.

Using an audio simulation system may enhance the ability to create a meaningful connection between presenters and audience members in a virtual environment. For instance, audience members may be more likely to remain engaged in a presentation when they are capable of sharing their thoughts, emotions, and impressions throughout the presentation. Accordingly, unconventional technical approaches may be beneficial to connect one or more network access devices associated with presenters and audience members in a way that allows for the generation and sharing of communications through sound and visual cues. For example, to indicate approval of a presentation or presenter, audience members may choose to generate sounds such as clapping or laughing through the use of simulated buttons in a network access device(s). Further, audience members may choose to generate sounds such as booing or yawning using the network access device(s). In this manner, presenters are capable of receiving feedback in a real-time manner, thereby leading to improved presentations. Accordingly, the disclosed computerized systems and methods provide an unconventional technical solution with advantageous benefits over extant systems that fail to provide audience members with an opportunity to share communications through sound, visual cues, or a combination thereof, using network access devices.

An audio simulation system may refer to any apparatus, method, structure or any other technique for generating electrical, mechanical, graphical, or other physical representation of a sound, vibration, frequency, tone, or other signal transmitted through air or another medium. As will be appreciated by those having ordinary skill in the art, the system may include one or more separate sub-systems that together and/or separately perform the functions described herein. The system may include one or more electrical environments, such as one or more software applications running on one or more electronic devices such as laptops, smartphones, or tablets. The audio may be simulated in the electronic environment, such as a presentation platform where one or more presenters, one or more audience members, or both receive the simulated audio signals. For example, the one or more presenters may receive one or more simulated audio signals such as clap sounds through an electronic device, while the audience members do not. In another example, the system may be configured to resemble a traditional presentation room, whereby both the one or more presenters and the one or more audience members receive the simulated audio claps.

Figure 9:
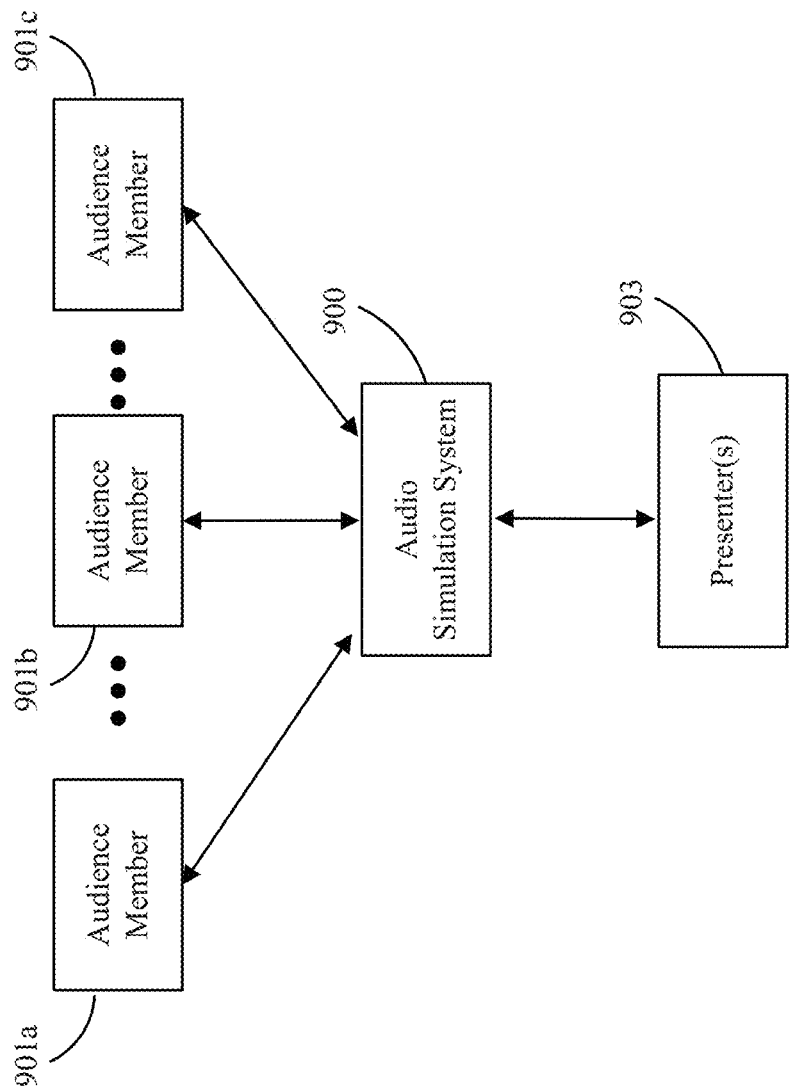
FIG. 9 is a block diagram of an exemplary audio simulation network, consistent with some embodiments of the present disclosure.

For example, FIG. 9 illustrates an exemplary audio simulation network 900 in a presentation environment, consistent with embodiments of the present disclosure. In FIG. 9, audio simulation system 900 may receive non-audio input and any other information from one or more audience members, such as audience members 901*a*, 901*b*, and/or 901*c* through one or more network access devices as described in more detail herein. After processing the received non-audio input as described herein, audio simulation system 900 may provide variable output as a function of the non-audio input to one or more presenters, such as presenter(s) 903, and/or audience members 901*a*, 901*b*, and/or 901*c*.

It is to be understood, however, that the claimed invention is not limited to presentation applications, but rather may be used in any circumstance or location where simulating audio would be beneficial, such as during workflow management, performance review, social media, content sharing, or any other scenario where one or more persons wish to provide or receive one or more responses. As a non-limiting example, the system may be part of workflow management software that may enable various members of a team to cooperate via a common online platform. The workflow management software may include one or more boards with items related to one or more tasks associated with one or more projects, clients, deals, or other organization information. As a result of one or more changes in the tasks, a simulated audio signal may be generated. For example, upon completion of a task, one or more individuals associated with the task may receive a simulated clapping sound thereby signaling the completion of the task. In an alternate example, the simulated audio signal may be generated as a result of an individual's level of performance. For example, a clapping sound may be simulated upon reaching a milestone, or upon achieving a threshold level of performance in all tasks in a financial quarter. The above-referenced examples are provided for illustration purposes only and are not intended to limit the scope of the innovations described herein.

Figure 10A:
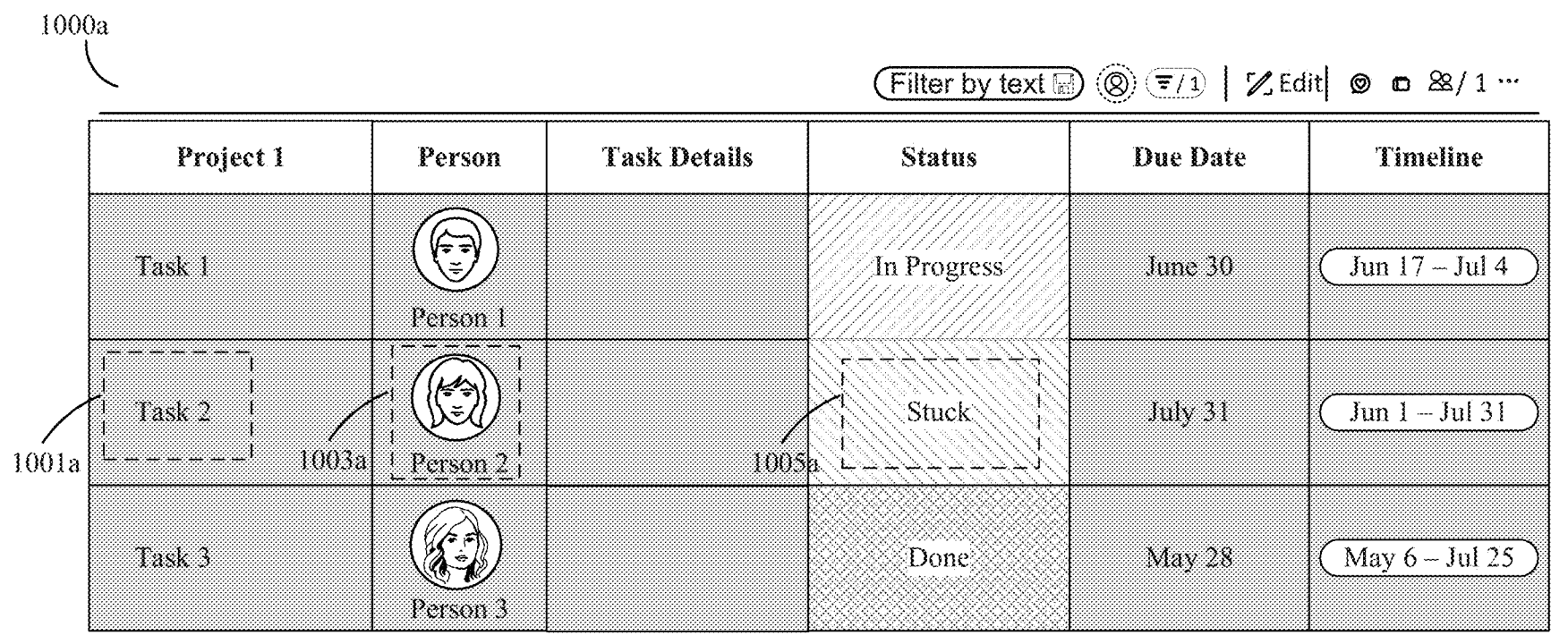

For example, FIGS. 10A and 10B illustrate exemplary workflow boards 1000*a* and 1000*b*, respectively, for use with the audio simulation system, consistent with embodiments of the present disclosure. In FIG. 10A, board 1000*a* may include various pieces information associated with one or more tasks (e.g., "Task 2" 1001*a*), including persons associated with that task (e.g., "Person 2" 1003*a*), task details, status (e.g., "Stuck" status 1005*a*), due date, timeline, and any other information associated with the task. As a result of change in information, the audio simulation system may be configured to output one or more sound files as described herein. Comparing FIG. 10A with FIG. 10B, for example, it can be seen that the status changes from "Stuck" status 1005*a* in FIG. 10A to "Done" status 1005*b* in FIG. 10B. As a result of this change in status, the audio simulation system may be configured to generate an output, such as a clapping sound. The person associated with the task (e.g., "Person 2" 1003*b*) may consequently receive an auditory cue of the change in status. Any other information associated with the board may be used by the audio simulation system to generate one or more outputs.

The simulated audio may be generated as a variable output as a function of disbursed non-audio input, consistent with disclosed embodiments. The simulated audio signal may be an output of one or more processors that are part of the audio simulation system, such as through one or more signals, instructions, operations, or any method for directing the generation of sound through air or another medium. The audio may be outputted with the aid of any suitable process or device for generating sound, such as through one or more speakers, Universal Serial Bus (USB) devices, software applications, internet browsers, VR or AR devices, a combination thereof, or any other method of producing or simulating sound. The output may be variable, consistent with disclosed embodiments. The term "variable" may refer to the ability of the simulated audio to change based on one or more factors, or to provide differing outputs based on differing inputs. In some embodiments, the simulated audio may change as a result of one or more non-audio inputs. A non-audio input may be one or more signals, instructions, operations, a combination thereof, or any data provided to the at least one processor. A non-audio input may represent electrical, mechanical, or other physical data other than sound. For example, a non-audio input may represent a user action, such as a mouse click, a cursor hover, a mouseover, a button activation, a keyboard input, a voice command, a motion, an interaction performed in virtual or augmented reality, or any other action by a user received via the at least one processor. As non-limiting examples, a non-audio input may occur as the result of one or more users interacting with one or more physical or digital buttons such as a "Clap" or "Laugh" button, digital images, or icons such as a heart emoji, motion sensors through physical movement such as by making a clapping motion, digital interaction such as by "liking" an image or video, or any other way of communicating an action.

Disclosed embodiments may involve receiving over a network, during a presentation, from a plurality of network access devices, a plurality of non-audio signals. A presentation may refer to any circumstance or scenario where one or more users, individuals, electronic apparatus, programs, a combination thereof, or any other device or entity share information among one another. For example, a presentation might involve a video conference or broadcast presentation where at least one individual is able to communicate with a group of individuals located in a common space or dispersed and communicatively coupled over one or more networks. A network may refer to any type of wired or wireless electronic networking arrangement used to exchange data, such as the Internet, a private data network, a virtual private network using a public network, a Wi-Fi network, a LAN, or WAN network, and/or other suitable connections, as described above. At least one processor may receive a plurality of non-audio signals from a plurality of network access devices capable of transmitting information through the network, such as one or more mobile devices, desktops, laptops, tablets, touch displays, VR or AR devices, a combination thereof, or through any other device capable of communicating directly or indirectly with the at least one processor. At least one transmission pathway may involve BLUETOOTH™, BLUETOOTH LE™ (BLE), Wi-Fi, near field communications (NFC), radio waves, wired connections, or other suitable communication channels that provide a medium for exchanging data and/or information with the at least one processor.

Figure 11:
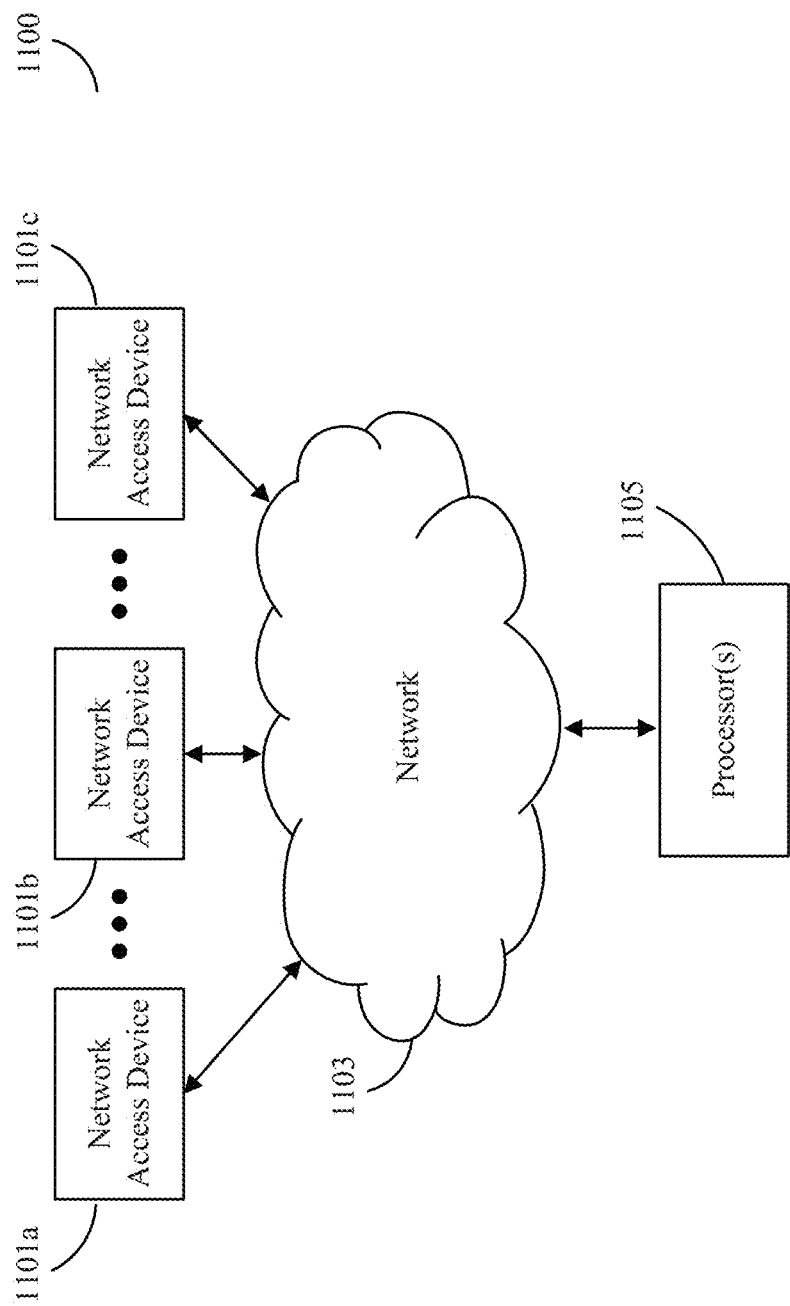
FIG. 11 is a network diagram of an exemplary audio simulation system, consistent with some embodiments of the present disclosure.

For example, FIG. 11 illustrates an exemplary audio simulation network 1100, consistent with embodiments of the present disclosure. In FIG. 11, one or more network access devices, such as network access devices 1101a, 1101b, and 1101c, may be in electronic communication with one or more networks, such as network 1103. Network access devices 1101a, 1101b, and 1101c may be the same or similar to user devices 220-1 to 220-m in FIG. 2. The system may include at least one processor, such as processor 1105, in electronic communication with network 1103. Processor(s) 1105 may be the same or similar to computing device 100 illustrated in FIG. 1. Through network 1103, the at least one processor 1105 may receive a plurality of non-audio signals, and any other suitable information, from network access devices 1101a, 1101b, and 1101c. In some embodiments, other sub-systems or elements (not shown) may be present between network 1103 and the at least one processor 1105 and/or network access devices 1101a, 1101b, and 1101c.

The received non-audio signals may correspond to activations of substitute audio buttons, consistent with disclosed embodiments. A "substitute audio button" may refer to one or more physical buttons, virtual buttons, activable elements, a combination thereof, or any other device or element for triggering an event when activated. For example, in embodiments where the simulated audio system is used with a presentation platform, a substitute audio button may be a graphical control element labeled with the text "Clap," an emoji of hands clapping, or a physical button in connection with the presentation platform such as through a physical (e.g., USB) or wireless (e.g., BLUETOOTH™) communication. Other buttons may indicate a laugh, sigh, yawn, boo, hiss, unique sound, words, or any other reflection of human expression. As a further example, in embodiments where the simulated audio system is used with a workflow management software, a substitute audio button may be part of a messaging platform overlaying a board, may be a virtual button contained in a cell of a board, or may be located anywhere in the platform in any interface at any level (e.g., in a board, dashboard, widgets, or any other element of the workflow management software). It is to be understood that a substitute audio button need not be part of the same environment or platform as where the at least one processor generates its output, but may rather be part of a third-party application or may otherwise be available at a different place or time. In some embodiments, the substitute audio button may include information related to its corresponding activation(s), such as an identification of a presenter, presentation, audience member, board, dashboard, widget, a combination thereof, or any other information related to the activation(s).

Figure 12:
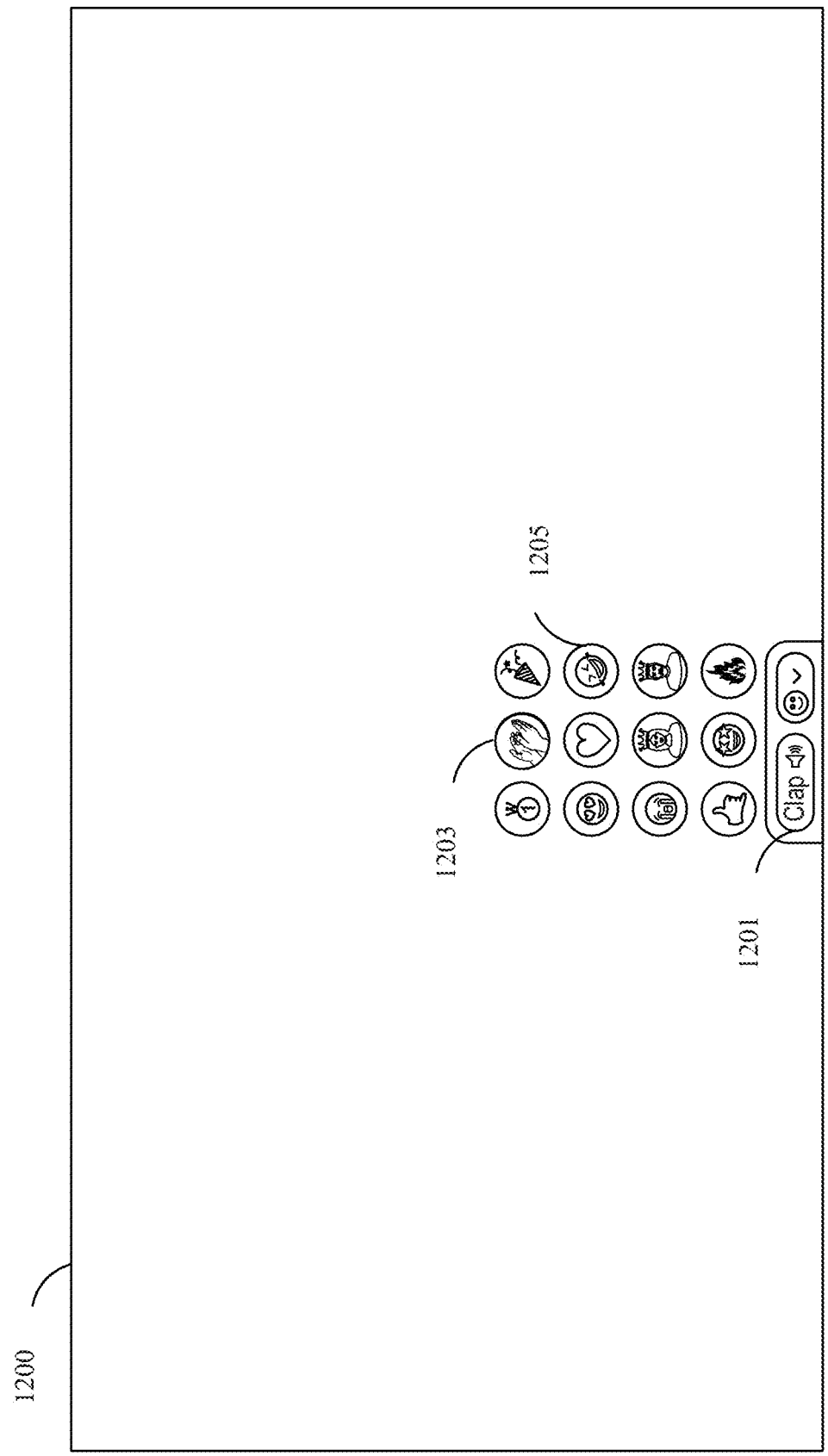
FIG. 12 illustrates an exemplary network access device containing substitute audio buttons, consistent with some embodiments of the present disclosure.

For example, FIG. 12 illustrates an exemplary network access device display 1200 containing substitute audio buttons, consistent with embodiments of the present disclosure. In FIG. 12, a network access device may include one or more displays, such as display 1200, for containing substitute audio buttons, such as substitute audio buttons 1201 ("Clap" button), 1203 (clapping emoji), and 1205 (laughing emoji). A user may interact with one or more substitute audio buttons, thereby causing the network access device to generate one or more non-audio signals for transmission to the simulated audio system as described herein.

In some embodiments, each of the plurality of non-audio signals may have an audio identity. An audio identity may refer to an association with one or more sound files, portions of sound files, sound samples, analog audio, a combination thereof, or any other representations of sound. For example, in embodiments where a non-audio signal corresponds to an activation of a "Clap" button, the non-audio signal's audio identity may be clapping and may be associated with one or more sound files of a single clap, multiple claps, a standing ovation, a crowd cheer, or a combination thereof. It is to be appreciated, however, that an audio identity may be associated with more than one representation of sound, either simultaneously or at separate times, and may be dependent on one or more variables or circumstances as described herein. In some embodiments, for example, the audio identity of the substitute audio buttons may include at least one of clapping or laughing. Similar to the clapping example described earlier, if the audio identity of a button is laughing, it may be associated with one or more sound files of single laughs, multiple laughs, a somewhat larger group laugh, a room full of laughter, or a combination thereof. In some cases, multiple sound files might be simultaneously activated, resulting in multiple simultaneous sounds, such as clapping and laughing, or a toggle between a clapping sound and a laughing sound based on one or more circumstances (e.g., based on the presentation or another context, or as a result of a user action), or a combination thereof. In other embodiments, the clapping sound may be entirely replaced with a different sound altogether, such as based on a user preference or an administrator action.

For example, in FIG. 12, an activation of "Clap" button 1201 or clapping emoji 1203 may generate one or more non-audio signals having an audio identity of clapping. Similarly, an activation of laughing emoji 1205 may generate one or more non-audio signals having an audio identity of laughing. In some embodiments, an emoji button may be associated purely with a non-sound output and lack an audio identity. Other simulated buttons shown in FIG. 12 may have a unique audio identity of may share audio identities amongst one another.

In some embodiments, each of the plurality of non-audio signals may correspond to a common audio identity. For example, the plurality of non-audio signals received by the at least one processor may share a same audio identity, such as clapping, laughing, cheering, booing, or any other identity as described above. In some embodiments, at least a first group of the plurality of non-audio signals may have a first audio identity that differs from a second audio identity of a second group of the plurality of non-audio signals. Following the example above, a first group of the plurality of non-audio signals may have a first audio identity associated with clapping, and may be associated with one or more sound files of a single clap, multiple claps, a standing ovation, a crowd cheer, or a combination thereof. A second group of the plurality of non-audio signals, on the other hand, may have a second audio identity associated with laughing, and may be associated with one or more sound files of a single laugh, a chuckle, a crowd laughter, or a combination thereof. The first and second group of non-audio signals may be generated as a result of an activation of the same or different substitute audio buttons.

Some disclosed embodiments may involve processing the received plurality of non-audio signals to determine a quantity of non-audio signals corresponding to a specific audio identity. A quantity of non-audio signals corresponding to a specific audio identity may be determined using one or more aggregating operations, mathematical counters, logical rules, or any other method of performing arithmetic computations. For example, in embodiments where a specific audio identity includes clapping, each non-audio signal associated with clapping may increase a total quantity corresponding to the specific audio identity by one. As a further example, in embodiments where the specific audio identity includes both clapping and laughing, each non-audio signal associated with either clapping or laughing may increase the total quantity corresponding to the specific audio identity by one. It is to be understood, however, that other computations and information may be used to determine the quantity, such as by counting audio-signals associated with one or more specific users (e.g., using a specific username) or audience members (e.g., using all usernames in a presentation or room), activations of a substitute audio button, interactions with elements in the audio simulation system, or any other information generated or used by the system. In some embodiments, for example, processing may include counting a number of non-audio signals received. In such embodiments, a quantity of total non-audio signals received from all or specific sources (e.g., using specific usernames, presentations, or rooms) may be determined using the same or similar manner as described above, such as by using one or more aggregating operations, mathematical counters, logical rules, or any other method of performing arithmetic computations. For example, in both scenarios described above, regardless of the specific audio identity, each non-audio signal associated with clapping or laughing may increase by one a total quantity corresponding to the number of non-audio signals received. The system may subsequently utilize the number of non-audio signals received in other processes and determinations. For example, the system may determine how many times a specific user interacts with a substitute audio button with respect to a total number of interactions received, such as by determining that the user interacted with a "Clap" button five times out of twenty total interactions during a presentation. In some embodiments, as a further example, processing may include counting a first number of signals in the first group of the plurality of non-audio signals and counting a second number of signals in the second group of the plurality of non-audio signals. In such embodiments, a first group of signals and a second group of signals may be selected using one or more patterns, one or more functions, as a result of one or more variables, randomly, or through any other criteria for selecting information. The first group of signals and the second group of signals may be counted in the same or similar manner as described above. For example, a first group of the plurality of non-audio may be associated with clapping, while a second group of the plurality of non-audio signals may be associated with laughing. As a result, each non-audio signal associated with clapping may increase by one a total quantity corresponding to the first group, while each non-audio signal associated with laughing may increase by one a total quantity corresponding to the second group.

Some disclosed embodiments may involve limiting a number of non-audio signals processed from each network access device within a particular time frame. The number of non-audio signals processed may be limited using one or more thresholds on the count of number of non-signals received, such that the system does not process any non-audio signals received from a specific network access device above that threshold. For example, if, during a period of time a user repeatedly presses the clap button, the system may count all the presses as a single press (e.g., such as by ignoring all additional presses beyond the first). In some embodiments, the system may set a limit based on one or more criteria besides a specific network access device, such as one or more user identifications, user interactions, activations of substitute audio buttons, or any other suitable information for regulating the number of non-audio signals processed by the system. The limit may be associated with a particular time frame, which may be milliseconds, seconds, minutes, hours, days, presentation(s), slides, scenes, or any other discrete period for processing non-audio signals. The time frame may be fixed, dynamic, or both. For example, upon a group of users interacting with a "Clap"

button for more than a predetermined limit of one-hundred claps per ten minutes, the system could be configured to stop processing any further user interactions with the "Clap" button for the remaining of the time limit, for another amount of time (e.g., for the rest of a presentation or permanently), or may reduce the number of interactions processed (e.g., one out of ten interactions). In some embodiments, the limit may be a single non-audio signal per unit of time. For example, the system could be configured to only process one non-audio signal per second, thereby registering a user's rapid interaction with a "Clap" button as only one per second. Any other unit of time may be used, such as one or more milliseconds, seconds, minutes, hours, or days.

In some embodiments, the at least one processor may be configured to process a plurality of non-audio signals processed from each network access device within a particular time frame. As a variation of the example above, if multiple users activate a clap button in a prescribed period, all might be counted together for the purposes of selecting a corresponding audio file. For example, the system may maintain a plurality of audio files associated with clapping for playback depending on a number of clap signals received from differing devices. If five users activate their clap buttons in a prescribed time frame, a small group clap audio file may be played back. However, if fifty users activate their clap buttons in the same prescribed period, a large crowd clapping audio file may be played back. The process may be dynamic in that if, over time, the number of users pressing their clap buttons increases, an initial audio file played back may be of a small crowd clapping, but the playback file may change to a larger crowd clapping one or more times as the button activations increase. Similarly, as the button activations decrease, the playback files may change to diminish the sound of clapping over time.

Some disclosed embodiments may involve performing a lookup in an audio-related data structure to select at least one particular audio file associated with the audio identity and the determined quantity. A data structure may be any compilation of information for storing information in an organized manner, such as one or more arrays, linked lists, records, unions, tagged unions, objects, containers, lists, tuples, multimaps, sets, multisets, stacks, queues, libraries, tree graphs, web graphs, or any other collection of information defining a relationship between the information. The data structure may include audio-related information so as to enable look-up to select at least one particular audio file. The data structure may, for example, include one or more audio files and corresponding identifications for looking up the one or more audio files; or it may include one or more lists of Uniform Resource Locators (URLs) for retrieving one or more audio files from a web address; or it may contain one or more functions (e.g., Application Programming Interfaces (APIs)) for accessing one or more audio files from an application or other electronic system. It is to be understood, however, that the contents of the data structure are not limited to any specific type of information but may rather include any suitable information for enabling efficient access of one or more audio files. In addition, the data structure may include information other than audio files, such as one or more images (e.g., emojis or avatars), one or more videos, or other information used by or generated by the system (e.g., information related to user interactions, such as a person that last interacted with a "Clap" button). The data structure or its associated information may be stored in any suitable location, such as within an application, on an online database, cached in a CPU or a browser or another electronic medium, a combination thereof, or any electronically accessible location. The look-up of the data structure may be performed in any suitable manner, such as according to one or more patterns, one or more functions, as a result of one or more variables, randomly, or through any other process for selecting information.

For example, FIG. 13 illustrates an exemplary display of information from data structure 1300 for performing a lookup, consistent with embodiments of the present disclosure. In FIG. 13, data structure 1300 may include any information related to one or more audio files, such as the file name, extension format, identification number, range of quantities, location, and any other information related to the one or more audio files. For example, audio file 1301 ("Single Clap") may have an identification 1303 and a location 1305 associated with it as defined by data structure 1300. If a processor receives under six clap signals from differing users, the corresponding audio file 1301 may be called for playback. If clap signals from between six and nine users are received, the audio file associated with audio file 1307 may be called for playback. When 10-20 clap signals are received, the audio file associated with the Medium Group Clap 1309 may be called. Similarly, when the parameters for a Large Group Clap 1311 and a Group Cheer 1313 are met, the corresponding audio files may be called. The process may be dynamic in that, as the number of clap signals received in a particular period grow, succeeding corresponding files may be called. The files may be played in an overlapping manner, such that a former fades as a later begins to provide a more natural transition between file playback. While FIG. 13 is illustrated by way of example only for clapping, similar files may be employed for laughing files and for any other sound or form of human expression. In addition, the ranges provided are exemplary only, and can depend on design choice. The ranges may also be dynamic in that they adjust to the size of an audience. For example, if the total audience size is 35, the most significant response (Group Cheer 1313) in FIG. 13 may be keyed to an upper range tied to the audience size of 35, and the other files may be accordingly scaled downwardly. Similarly, if the audience size is 350, the most significant response (Group Cheer 1313) in FIG. 13 may be tied to a much larger audience response. Depending on design choice, the system may also treat multiple button activations differently. For example, in some systems, a group of sequential pushes, in a predetermined time window, by the same individual might be counted separately. In other systems, the same group of sequential pushes by the same individual in the same time window may be counted as a single activation. Even in systems that count multiple pushes by the same individual, there may be a limit. For example, after three pushes, subsequent pushes may be ignored until a time window elapses. In yet other embodiments, rather than providing discrete files corresponding to a specific range of button presses, combinations of files may be played simultaneously. For example, in the example of FIG. 13, in lieu of a Large Group Clap 1311, as the signals received begin to exceed 20, Small Group Clap file 1307 might be played simultaneously with Large Group Clap file 1311. Additionally, or alternatively, instead of a file changing as the number of signals increase, audio playback volume may increase, or other sound characteristics of the file may be changed. It is to be understood that the information described above is provided for illustration purposes only, as the data structure may include any other information associated with one or more audio files. Moreover, the examples are not limited to clapping. Multiple forms of expression may be played back separately or simultaneously.

The audio file selected from the data structure may be associated with an audio identity, consistent with disclosed embodiments. An audio identity may a type of sound such as a clap, laugh, cheer, or any other form of expression. The audio identity may correspond to one or more sound files such as a single clap, multiple claps, a standing ovation, a crowd cheer, laughing, a combination thereof, or any other type of sound. The audio file may also be associated with a determined quantity of non-audio signals received, as described herein. A quantity may include one of more specific amounts, one or more ranges of amounts, one or more sets of amounts, a combination thereof, or any other arrangements of amounts. In some embodiments, a quantity may be stored in the data structure of may be retrieved using information in the data structure. In some embodiments, for example, the audio-related data structure may contain information about a plurality of audio files each associated with a common audio identity, wherein each of the plurality of audio files may correspond to a differing quantity of non-audio signals. For example, a common audio identity may be clapping, and a plurality of audio files may include, for example, a single clap, a small group clap, a medium group claim, a large group clap and a group cheer, as depicted in FIG. 13. The names of the file designations, the audio quality associated with them, and the range of triggering responses may differ, depending on design choice. Accordingly, when the system receives five non-audio signals, it may select the single clap sound file; and when the system receives six non-audio signals, it may select the Small Group Clap sound file 1307, and so forth. It is to be understood that the quantities listed above are provided for illustration purposes only, and other combinations of ranges and audio files may be used. In addition, as previously mentioned, the quantity associated with an audio file may be fixed or dynamic, and may change depending on one or more variables (e.g., the number of viewers in a presentation), one or more commands (e.g., an administrator setting a specific quantity value), a combination thereof, or any other change in information.

In some embodiments, performing a lookup may include identifying a first audio file corresponding to the first group of the plurality of non-audio signals and a second audio file corresponding to the second group of the plurality of non-audio signals. A first group of non-audio signals may correspond, for example, to a series of similar non-audio signals received from a number of differing user devices. A second group of non-audio signals may correspond, for example, to a series of differing similar non-audio signals received from a number of user devices. In one example, the first group may be clap signals and the second group may be laugh signals. As a result, whenever the system receives a non-audio signal associated with the first group, the system may perform lookup to select one or more clap audio files. In addition, whenever the system receives a non-audio signals associated with the second group, the system may perform lookup to select one or more laughing audio files. The two files may be played simultaneously. In the example of the clap and laugh signals, this may result in simultaneous playback of both clapping and laughing. The audio files may be actual record files of human laughter and human clapping, or they may be simulations.

Some disclosed embodiments may involve outputting data for causing the at least one particular audio file to be played. Outputting data may include generating any information through any electronic or physical means, such as through one or more signals, instructions, operations, communications, messages, data, or any other information for transmitting information, and which may be used with one or more speakers, headphones, sound cards, speech-generating devices, sound-generating devices, displays, video cards, printers, projectors, or any other output device. In some embodiments, outputting data may include transmitting an audio file, which may be subsequently be played through an output device (e.g., speaker). The audio file may be retrieved from a non-transitory readable medium (e.g., a hard drive or USB drive), through one or more downloads (e.g., from the Internet such as through Wi-Fi), through one or more functions or applications (e.g., APIs), through a wired connection (e.g., Ethernet), or through any other electrical or physical medium. In some instances, the output may be an audio file transmitted to users' devices. In other embodiments, the output may be a code that calls an audio file pre-stored on the users' devices. In still other embodiments where the code is sent, if a user's device lacks the audio file called for, the user's device may contact a remote server to retrieve the missing file. In yet other embodiments, the user's device may include a sound simulator, and the code may trigger the sound simulator to generate a desired sound. In alternative embodiments, the sound may be transmitted to a location in which a live presentation is occurring, for playback in that location. Participants who are watching the live presentation via their network access devices, would, in this instance, be presented with the selected audio file(s) together with audio of the live presentation.

For example, in FIG. 13, outputting Single Clap audio file 1301 may include downloading the audio file via the Internet from location 1305. The downloaded audio file may subsequently be electronically transmitted to one or more network access devices (e.g., a computer, smartphone, or tablet) or another output device (e.g., a speaker) to be played. Similarly, the audio file 1301 might be transmitted instead (or additionally) to a live location of a presentation, as discussed above.

In some embodiments as discussed above, outputting data may include transmitting an identification or other information associated with a location of the data file, and which may be used to thereby cause the audio file to play in its location or a different location. For example, one or more audio files may be stored in memory of a presenter's computer or other electronic device. Subsequently, as a result of a viewer interacting with a "Clap" button, the system may transmit an identification associated with a clap sound file to the presenter's computer or other electronic device, thereby causing the computer or other electronic device to generate a clapping sound. It is to be understood that other locations or methods of transmitting an information associated with audio files may be used, such as transmitting one or more URLs, online database information, samples, portions of sound files, or any other information capable of resulting in the transmission or generation of an audio file.

For example, in FIG. 13, outputting Single Clap audio file 1301 may include electronically transmitting identification 1303 to one or more network access devices (e.g., a computer, smartphone, or tablet) or another output device (e.g., a speaker). The one or more network access devices or another output device may subsequently retrieve audio file 1301 from memory or by downloading it via the Internet from location 1305.

In some embodiments, outputting may be configured to cause the at least one particular audio file to play via the presentation. As discussed above, as an alternative to causing playback to occur directly on a user's network access device, the playback may occur via the underlying presentation. For example, electronics in a lecture hall during a live presentation may cause audio to be received at that location and be merged with the presentation for transmission to the user. Alternatively, in some embodiments, outputting may be configured to cause the at least one particular audio file to play on the plurality of network access devices. For example, the audio signals (or codes to call them) may be sent to each user's device for playback. While in some embodiments all users watching the same presentation might receive the same audio files or codes to call them, that need not be the case. User experiences may differ in some embodiment depending on user preference. For example, a user might be enabled to deactivate an augmented sound track so as to avoid hearing clapping, laughing or other expressions. In other embodiments, a user might select substitute sounds for a clap, or might choose settings that limit the volume or other sound characteristics of the augmented audio track. In addition, there may be a delay between the play of two or more computers, or any other variation in the play of the sound.

In some embodiments, outputting may be configured to cause the at least one particular audio file to play via the presentation on the plurality of network access devices, as described herein. In such embodiments, the system may cause an audio file to play via the presentation and on the plurality of network access devices in the same or similar manner as described above.

In some embodiments, the outputted data may be configured to cause the first audio file and the second audio file to simultaneously play, as discussed earlier. In such embodiments, the first and second audio files may be different, similar, or the same audio files, and may be predetermined or may change based on one or more criteria, such as a specific number of selections, a specific user, a presentation, or any other information used or generated by the system. For example, upon receiving thirty non-audio signals associated with clapping and fifteen non-audio signals associated with laughing, the system may be configured to play thirty clap sound files and fifteen laugh sound files at the same time or in quick succession. The system may be configured to aggregate the received non-audio signals in a manner suitable for play, such as by adjusting a play volume based on the number of non-audio signals received. Following the example above, the system may be configured to play a single clap audio file at twice the volume of a single laugh audio file at the same time or in quick succession, since the number of received non-audio signals associated with clapping is twice the number of received non-audio signals associated with laughing. It is to be understood that other suitable ways of aggregating the received non-audio signals for simultaneously play purposes may be implemented, such as based on one or more users, presenters, presentations, rooms, times, or any other information used or generated by the system.

In some embodiments, the data structure may associate a first audio file with a first range of quantities of non-audio signals and a second audio file with a second range of quantities of non-audio signals, and when the determined quantity falls within the first range, outputting may be configured to cause the first audio file to playback. A range may include one of more specific quantities, one or more ranges of quantities, one or more sets of quantities, a combination thereof, or any other arrangements of quantities. The data structure may associate one or more audio files with one or more ranges in any organized manner, such as through one or more arrays, linked lists, records, unions, tagged unions, objects, containers, lists, tuples, multimaps, sets, multisets, stacks, queues, libraries, tree graphs, web graphs, or any other collection of information defining a relationship between an audio file and a range, as described above. For example, the data structure may associate a clap sound file with a range of one to ten activations of a "Clap" button, and may associate an applause sound file with eleven or more activations of the "Clap" button. Subsequently, when a quantity of activations of the "Clap" button is determined to be five, the system may select the clap sound file and may cause it to be transmitted or played. Conversely, when the quantity of activations of the "Clap" button is determined to be fifteen, the system may select the applause sound file and may cause it to be transmitted or played.

For example, in FIG. 13, one or more audio files, such as "Single Clap" audio file 1301, may include a "Range" variable 1317 corresponding to a quantity of non-audio signals for causing the system to playback the file. As an illustration, "Single Clap" audio file 1301 may have a range 1315 of "1-5" in data structure 1300, resulting in playback of audio file 1301 when the quantity of non-audio signals received is five or fewer.

In some embodiments, the at least one processor may be configured to maintain a count of a quantity of actively connected network access devices. The count may be generated or maintained using one or more aggregating operations, mathematical counters, logical rules, or any other method of performing arithmetic computations. For example, the system may include a count variable that is increased by one when a network access device (e.g., laptop, smartphone, or tablet) connects to the system, and is decreased by one when a network access device disconnects from the system. The at least one processor may be further configured to compare a number of received non-audio signals in a particular time frame with the count, consistent with disclosed embodiments. The number of received non-audio signals within a particular time frame may be compared with the count using one or more instructions, signals, logic tables, logical rules, logical combination rule, logical templates, or any operations suitable for comparing data. The specific time frame may be one or more milliseconds, seconds, minutes, hours, days, presentation(s), slides, scenes, a combination thereof, or any other discrete period for processing non-audio signals. The at least one processor may be further configured to select the at least one particular audio file to be played as a function of a correlation between the count and the number of non-audio signals received, consistent with disclosed embodiments. For example, the system may be configured to select a single clap audio file when the number of non-audio signals received is less than half of the count of actively connected network access devices. Similarly, the system may be configured to select a crowd cheer audio file when the number of non-audio signals received is equal to or greater than half of the count of actively connected network access devices. These are just two examples. The correlation may be based on design parameters of the system left to the system designer.

Other proportions and correlations may be used, such as those based on one or more specific users, presenters, presentations, locations, or any other information available to the system. In some embodiments, for example, the correlation may be a proportion of non-audio signals to the count, and as the proportion increases the output may be configured to cause an increase in a volume of play of the selected audio file. For example, the system may be configured to play the selected audio file at one-hundred percent volume when the number of non-audio signals received is equal to the count of actively connected network access devices. Similarly, the system may be configured to play the selected audio file at fifty percent volume when the number of non-audio signals received is equal to half the count of actively connected network access devices. So, for example, if half of a group of participants in a 300 person presentation press their clap buttons in a common time frame, the audio output may be equal to when half the participants in a 400 person presentation do the same. Again, this is just an example, and the system response parameters may be selected by the system designer within the scope of this disclosure. Other percentages and volumes may be used, as would be apparent to those having ordinary skill in the art. As a further example, in some embodiments, the selection of the at least one audio file may be a function of the proportion. For example, the system may be configured to play a single clap audio file when the number of non-audio signals received is less than half the count of actively connected network access devices. Similarly, for example, the system may be configured to play an applause audio file when the number of non-audio signals received is equal to or greater than half the count of actively connected network access devices. Other percentages and audio files may be used, as would be apparent to those having ordinary skill in the art.

In some embodiments, the at least one processor may be configured to receive an additional non-audio augmentation signal from an administrator to cause a playback of an audio file different from the particular audio file. An administrator may be any individual, entity, or program responsible for the configuration and/or reliable operation of the system, such as one or more individuals, entities, or programs associated with one or more applications, networks, databases, security functions, websites, computers, presentations, a combination thereof, or any other part of the system. For example, during particular times of a presentation, such as at the end of a presentation, when the particular audio file to play would otherwise be a small group clap audio file corresponding to the received non-audio signals, an administrator (e.g., the presenter) may cause an applause or a standing ovation audio file to play. Or if the presenter tells a joke that does not receive significant laughs, the presenter may effectively override the audience's response and manually cause a heightened laugh track to play through, for example, an augmented soundtrack button on the presenter's (or other administrator's display). In some embodiments, an administrator may stop the playback of an audio file altogether, such as when a laugh sound would play during an otherwise serious part of a presentation or during another inappropriate time. In this manner, the administrator may intervene when required to simulate or diminish audience participation. In addition, an administrator may have the ability to perform functions other than those associated with selecting an audio file for playback, such as volume control, banning or muting users, adjusting limits or other thresholds (e.g., a minimum number of interactions needed to cause an audio file to play), or any other functions related to the system. It is to be understood that an administrator need not be a person but may include a program configured to automatically perform any desired tasks, including those mentioned above.

Figure 14:
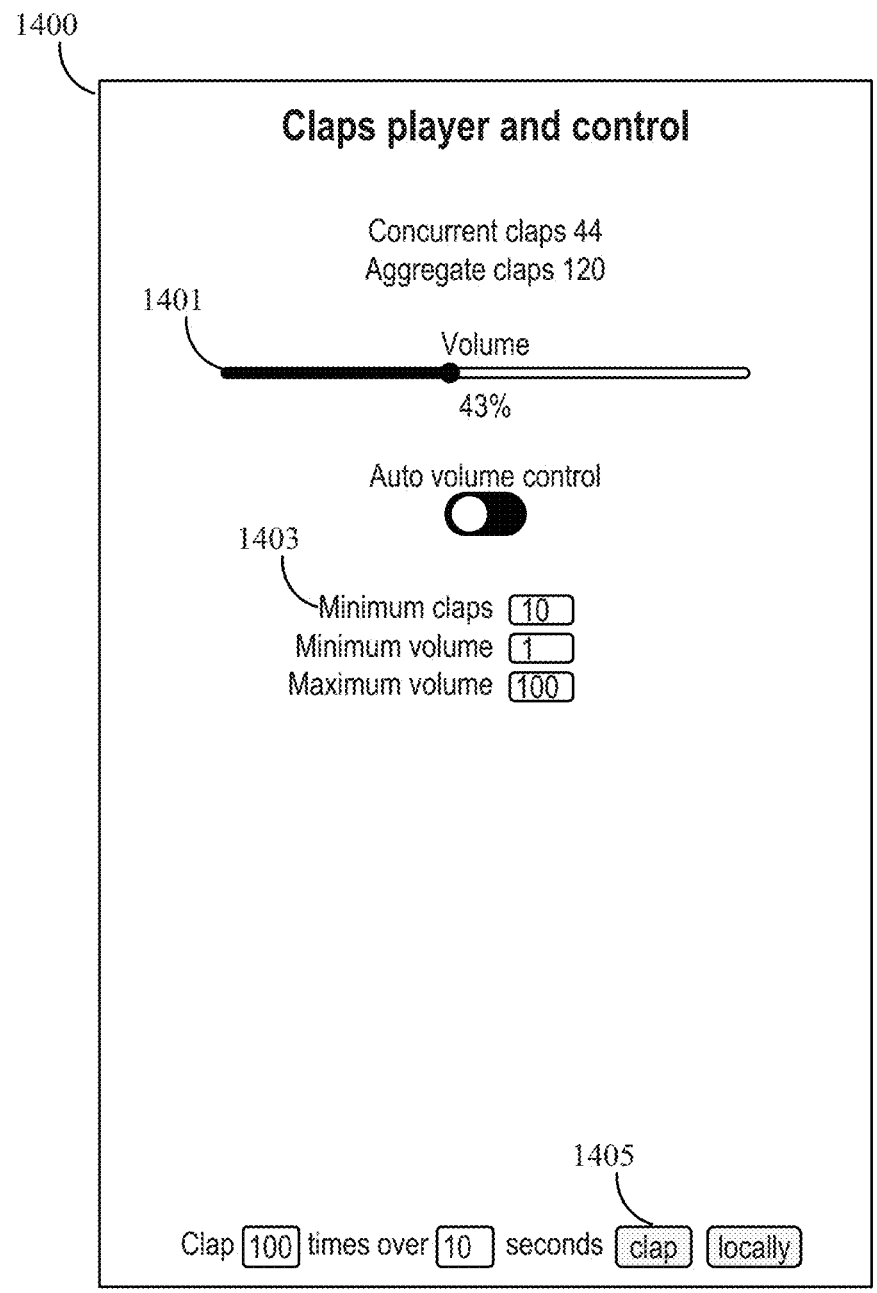
FIG. 14 illustrates an administrator control panel, consistent with some embodiments of the present disclosure.

For example, FIG. 14 illustrates an administrator control panel 1400, consistent with embodiments of the present disclosure. In FIG. 14, administrator control panel 1400 may include one or more interactive elements, such as "Volume" control 1401, "Minimum claps" control 1403, and "Clap" control 1405. "Volume" control 1401 may allow the administrator to adjust the volume of audio played (e.g., claps) by setting a slide to a desired location. "Minimum claps" control 1403 may allow the administrator to adjust a threshold number of clap activations required to trigger one or more events, such as playback of a clapping audio file. "Clap" control 1405 may allow the administrator to cause one or more audio files, such as a clapping audio file, to repeat over a time period, thereby allowing the administrator to simulate audience participation. As can be appreciated from FIG. 14, other actions and information may be available to administrators as suitable for the presentation or another context.

Some embodiments may involve causing both the at least one particular audio file and graphical imagery to be presented via the plurality of network access devices, consistent with disclosed embodiments. A graphical imagery may include one or more pictures, text, symbols, graphical interchange format (GIF) pictures, Cascading Style Sheets (CSS) animations, video clips, films, cartoons, avatars, static or animated stickers, static or animated emojis, static or animated icons, a combination thereof, or any other visual representations. The graphical imagery may be presented using one or more computer screens, mobile device screens, tablets, LED displays, VR or AR equipment, a combination thereof, or any other display device. In some embodiments, for example, the graphical imagery may include an emoji. For example, the system may be configured to output an emoji of hands clapping or a laughing emoji through one or more network access devices (e.g., computers, smartphones, or tablets).

Figure 15:
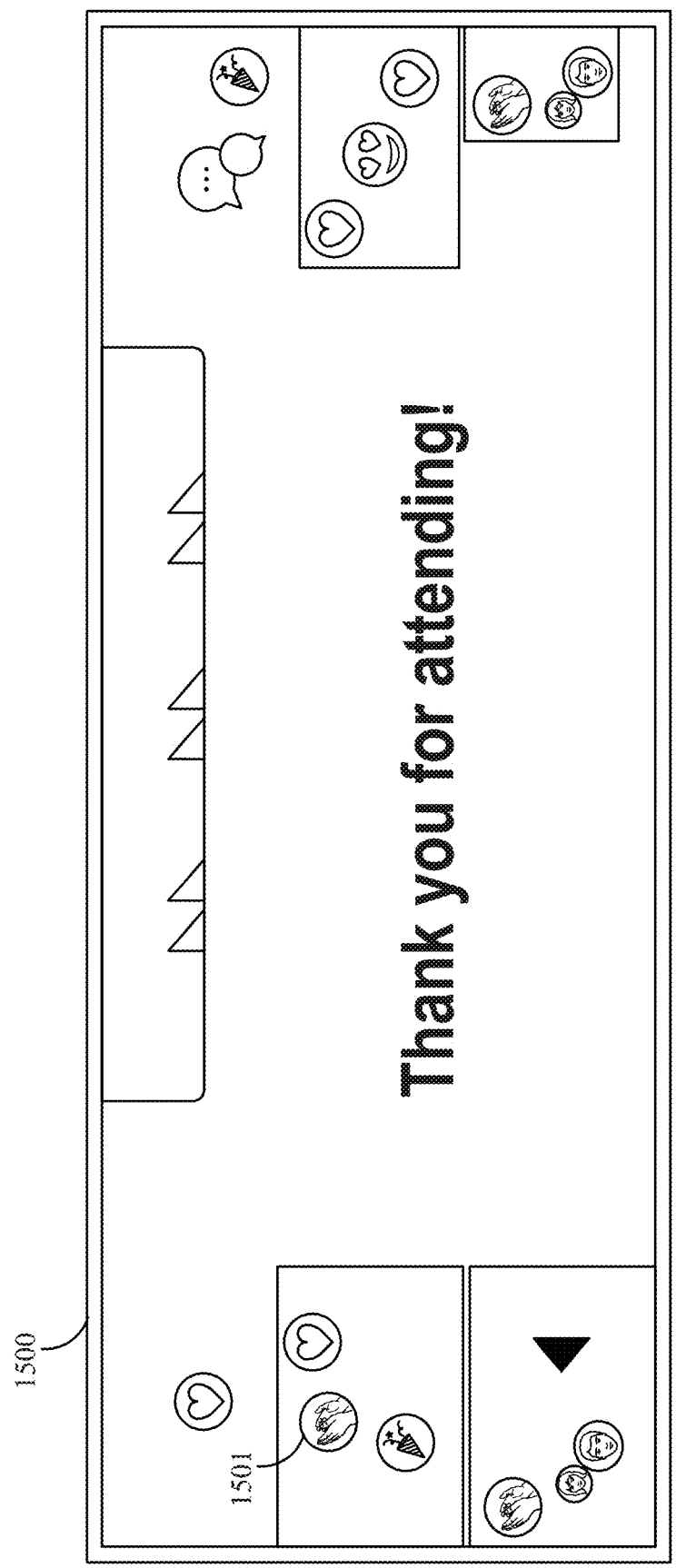
FIG. 15 illustrates an exemplary network access device display for presenting one or more graphical imageries, consistent with some embodiments of the present disclosure.

For example, FIG. 15 illustrates an exemplary network access device display 1500 for presenting one or more graphical imageries, consistent with embodiments of the present disclosure. In FIG. 15, display 1500 may be used to present a presentation as disclosed herein. As a result of an audience member interacting with one or more substitute audio buttons, such as "Clap" button 1201 or clapping emoji 1203, in FIG. 12, display 1500 in FIG. 15 may be configured to display a graphical image in the form of a clapping emoji 1501. As can be appreciated from FIG. 15, display 1500 may present other graphical imagery, such as one or more avatars, heart emojis, firecracker emojis, or any other visual representation as a result of the same or different interaction.

In some embodiments, the graphical imagery may be correlated to the audio file. The term "correlated" may refer to any mutual relationship or connection between the graphical imagery and the audio file. For example, the system may be configured to output an emoji of hands clapping when a clapping sound is outputted. As a further example, the system may be configured to output an animated graphic of glasses clinking when an audio file of glasses clinking is played. As yet a further example, the system may be configured to output a video clip of fireworks when a fire crackling sound is outputted. In addition, the system may also be configured to alter a size, animation, speed, or other attribute of the graphical imagery. For example, the system may cause the graphical imagery to become an animated clap GIF or a larger clap emoji when a user interacts with the clapping button in rapid succession.

Figure 16:
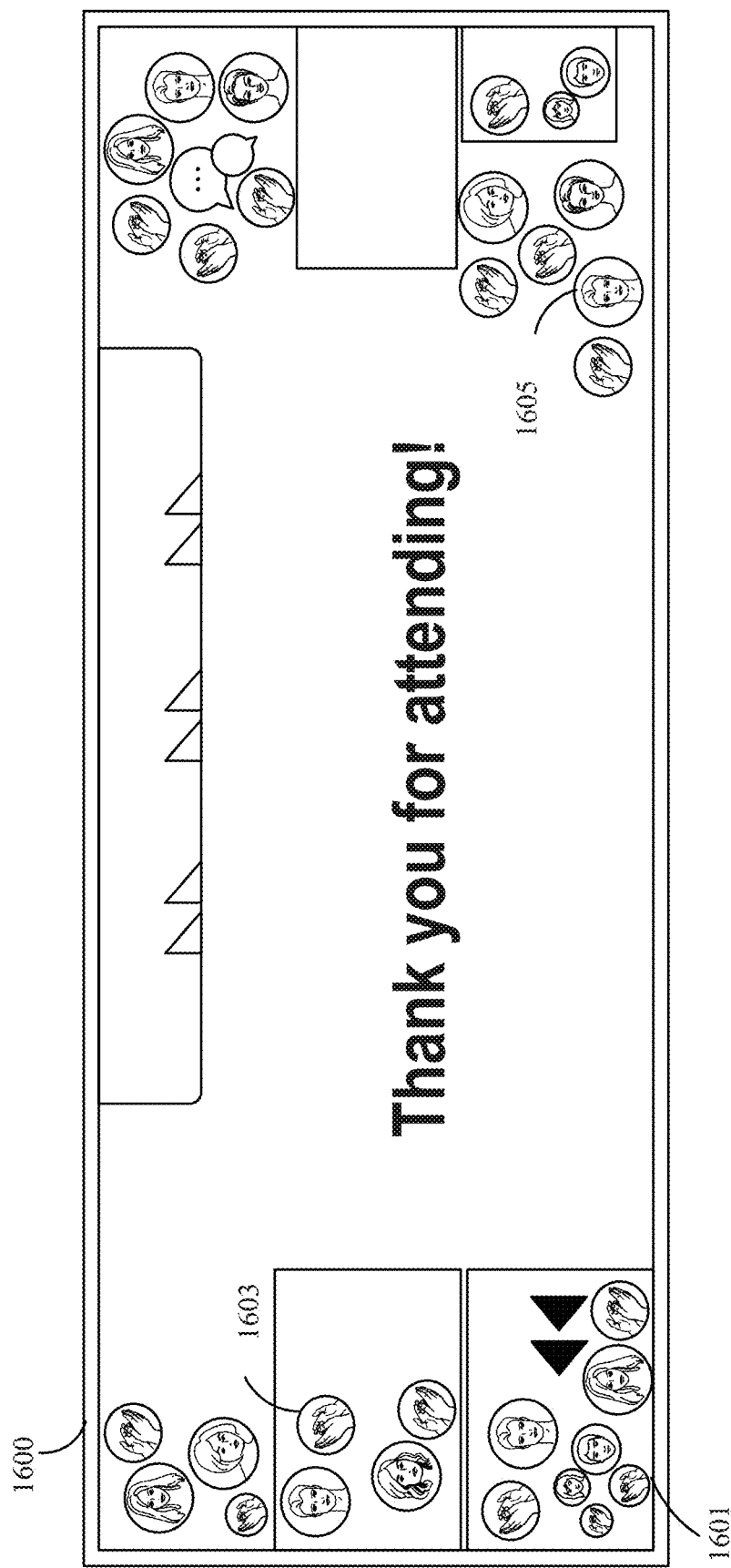
FIG. 16 illustrates another exemplary network access device display for presenting one or more graphical imageries, consistent with some embodiments of the present disclosure.

For example, FIG. 16 illustrates another exemplary network access device display 1600 for presenting one or more graphical images, consistent with embodiments of the present disclosure. In FIG. 16, display 1600 may include one or more graphical images, such as clapping emojis 1601 and 1603 and avatar 1605. As can be seen from comparing clapping emoji 1601 and clapping emoji 1603, the system may be configured to alter one or more attributes of the graphical images, in this example size, as a result of one or more conditions. For example, clapping emoji 1601 may start at a small size and progressively become as large as clapping emoji 1603 over time; or its size may be adjusted as a result of one or more users rapidly interacting with a simulated audio button, such as "Clap" button 1201 or clapping emoji 1203 in FIG. 12.

In some embodiments, the graphical imagery may correspond to activations of graphical imagery buttons on a plurality of network access devices. The term "graphical imagery buttons" may refer to any interactive element, such as one or more buttons, icons, texts, links, check boxes, radio button, slides, spinners, or a combination thereof, that may include one or more graphical images as defined above. For example, the system may be configured to output an emoji of hands clapping when a user interacts with a "Clap" button. As a further example, the system may be configured to output an animated graphic of glasses clinking in response to a user interacting with a "Cheers" button. As yet a further example, the system may be configured to output a video clip of fireworks when a user interacts with a "Fire" button.

In some embodiments, the graphical imagery may reflect identities of a plurality of individuals associated with the plurality of network access devices. An individual may be any user or group of users associated with one or more network access devices (e.g., computer, smartphone, or tablet), user identifications, user accounts, Internet Protocol (IP) addresses, or any other suitable method of differentiating users. For example, the system may be configured to output one or more avatars, images, video clips, alphabetical characters, numbers, a combination thereof, or any other visual element corresponding to a user. This may occur as a result of a user interacting with one or more elements (such as a "Clap" button), at regular intervals, randomly, based on one or more variables, a combination thereof, or at any other suitable times.

For example, in FIG. 16 display 1600 may include one or more graphical images reflecting an identity of an individual, such as avatar 1605. The system may be configured to present the identity, in this case a circular avatar, as a result of one or more conditions. For example, display 1600 may display avatar 1605 as a result of one or more user interactions with a simulated audio buttons, such as "Clap" button 1201 or clapping emoji 1203 in FIG. 12.

Figure 17:
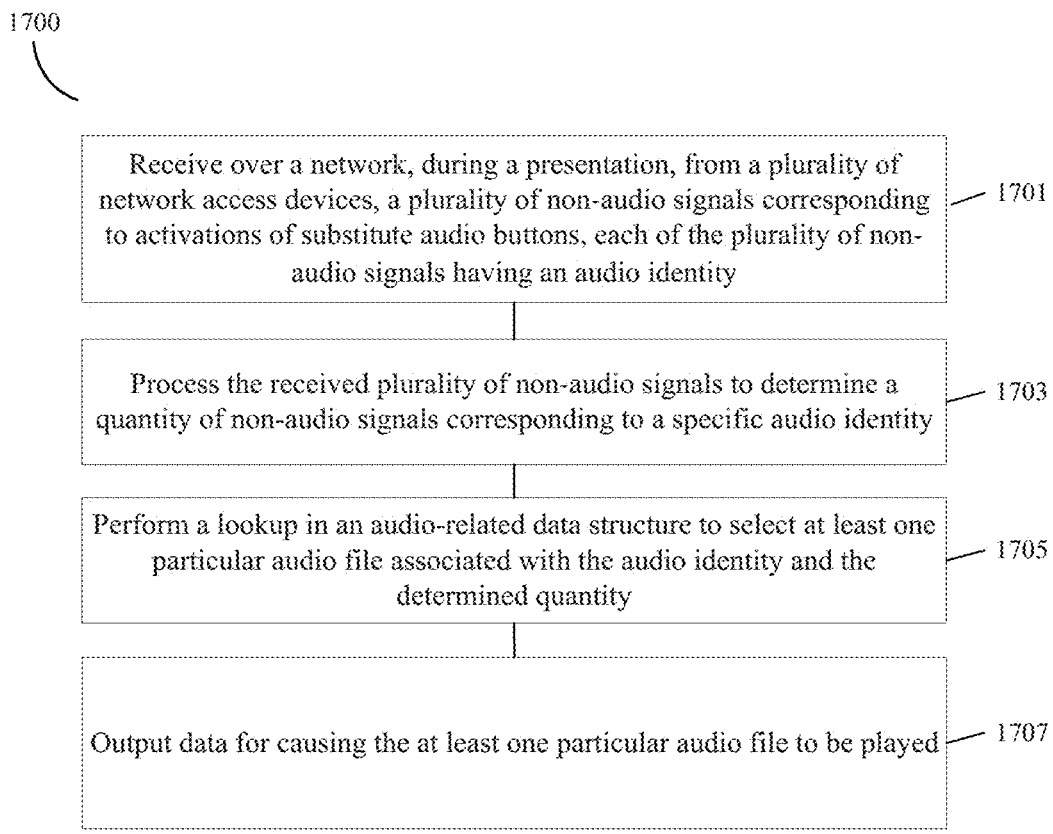
FIG. 17 illustrates a block diagram of an example process for performing operations for causing variable output audio simulation as a function of disbursed non-audio input, consistent with some embodiments of the present disclosure.

FIG. 17 illustrates a block diagram of an example process 1700 for performing operations for causing variable output audio simulation as a function of disbursed non-audio input, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 1700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 9 to 16 by way of example. In some embodiments, some aspects of the process 1700 may be implemented as software (e.g., program codes or instructions) that are stored in a memory (e.g., the memory portion 122 in FIG. 1) or a non-transitory computer-readable medium. In some embodiments, some aspects of the process 1700 may be implemented as hardware (e.g., a specific-purpose circuit). In some embodiments, the process 1700 may be implemented as a combination of software and hardware.

FIG. 17 includes process blocks 1701 to 1707. At block 1701, a processing means (e.g., the processing circuitry 110 in FIG. 1) may receive over a network, during a presentation, from a plurality of network access devices, a plurality of non-audio signals corresponding to activations of substitute audio buttons, each of the plurality of non-audio signals having an audio identity (e.g., as with audio simulation system 1100 in FIG. 11). The presentation may include for example, a broadcast over any platform, such as a video conference, audio conference, group chat, interactions on a shared networked platform, or any other mechanism that permits group interactions. In such group interactions, participants access the interaction though network access devices as described earlier. Those network access devices may be provided interactive buttons, provided for example, via a downloaded application or a web application. The interactive buttons may include substitute audio buttons. The buttons may be considered "substitute" because instead of clapping or laughing, the user might push a corresponding button. Clapping and laughing, may each be considered a separate audio identity. During a presentation watched by a group, a number of differing viewers or participants may simultaneously press (or press during a common timeframe) a clapping button, for example. This in turn, may cause the user's network access device to transmit a non-audio signal reflective of an intent to clap. When multiple users do the same, the plurality of non-audio signals may correspond to a common audio identity (in this example, clapping). In some embodiments, at least a first group of the plurality of non-audio signals may have a first audio identity that differs from a second audio identity of a second group of the plurality of non-audio signals. For example, non-audio clap and laugh signals can be received in a common time frame.

At block 1703, the processing means may process the received plurality of non-audio signals to determine a quantity of non-audio signals corresponding to a specific audio identity. For example, in a common time frame, the processor may determine that fifteen users sent non-audio clap signals. Processing those signals may include counting them. In some embodiments, processing may include counting a first number of signals in the first group of the plurality of non-audio signals (e.g., claps) and counting a second number of signals in the second group of the plurality of non-audio signals (e.g., laughs). In some embodiments, the processing means may limit a number of non-audio signals processed from each network access device within a particular time frame. In some embodiments, the limit may be a single non-audio signal per unit of time. In some embodiments, the processing means may process a plurality of non-audio signals processed from each network access device within a particular time frame.

At block 1705, the processing means may perform a lookup in an audio-related data structure to select at least one particular audio file associated with the audio identity and the determined quantity (e.g., as with data structure 1300 in FIG. 13). In some embodiments, the audio-related data structure may contain information about a plurality of audio files each associated with a common audio identity, wherein each of the plurality of audio files may correspond to a differing quantity of non-audio signals. For example, if a first number of non-audio signals are received corresponding to claps, a corresponding audio file may be selected that is different from the file that would have been selected had a larger number of non-audio files have been received. In some embodiments, performing a lookup may include identifying a first audio file corresponding to the first group of the plurality of non-audio signals and a second audio file corresponding to the second group of the plurality of non-audio signals.

At block 1707, the processing means may output data for causing the at least one particular audio file to be played. In this way, the presentation may become participatory in that the viewers' collective reactions can be aggregated and shared with the group. When a group of viewers all send no audio clapping signals, their collective response may trigger a corresponding file to be played back for all participants to hear. The file may be played through each network access device separately or may be played via the presenters' (or some other central) device. Thus, in some embodiments, outputting may be configured to cause the at least one particular audio file to play via the presentation. In some embodiments, outputting may be configured to cause the at least one particular audio file to play on the plurality of network access devices. In some embodiments, outputting may be configured to cause the at least one particular audio file to play via the presentation and on the plurality of network access devices. In some embodiments, the outputted data may be configured to cause the first audio file and the second audio file to simultaneously play. In some embodiments, the data structure may associate a first audio file with a first range of quantities of non-audio signals and a second audio file with a second range of quantities of non-audio signals, and when the determined quantity falls within the first range, outputting may be configured to cause the first audio file to playback.

In some embodiments, the processing means may maintain a count of a quantity of actively connected network access devices, to compare a number of received non-audio signals in a particular time frame with the count, and to select the at least one particular audio file to be played as a function of a correlation between the count and the number of non-audio signals received. In some embodiments, the correlation may be a proportion of non-audio signals to the count, and as the proportion increases the output may be configured to cause an increase in a volume of play of the selected audio file. In some embodiments, the selection of the at least one audio file may be a function of the proportion.

In some embodiments, the processing means may receive an additional non-audio augmentation signal from an administrator to cause a playback of an audio file different from the particular audio file (e.g., such as by using administrator panel 1400 in FIG. 14).

In some embodiments, the processing means may cause both the at least one particular audio file and graphical imagery to be presented via the plurality of network access devices (e.g., clapping emoji 1501 in FIG. 15). In some embodiments, the graphical imagery may be correlated to the audio file. In some embodiments, the graphical imagery may correspond to activations of graphical imagery buttons on a plurality of network access devices. In some embodiments, the graphical imagery may reflect identities of a plurality of individuals associated with the plurality of network access devices (e.g., avatar 1605 in FIG. 16).

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- maintaining and causing to be displayed a workflow table having rows, columns and cells at intersections of rows and columns;
- tracking a workflow milestone via a designated cell, the designated cell being configured to maintain data indicating that the workflow milestone is reached;
- accessing a data structure that stores at least one rule containing a condition associated with the designated cell;
- wherein the at least one rule contains a conditional trigger associated with at least one remotely located dispenser;
- receiving an input via the designated cell;
- accessing the at least one rule to compare the input with the condition and to determine a match;
- following determination of the match, activating the conditional trigger to cause at least one dispensing signal to be transmitted over a network to the at least one remotely located dispenser in order to activate the at least one remotely located dispenser and thereby cause the at least one remotely located dispenser to dispense a physical item as a result of the milestone being reached;
- wherein the workflow milestone is associated with at least one of a deadline, a status, a date, or a threshold;
- wherein the at least one remotely located dispenser is configured to hold a plurality of confections and to dispense a confection in response to the dispensing signal;
- wherein receiving the input occurs as a result of an update to the designated cell;
- wherein the rule is an automation that associates the designated cell with the condition and an entity;
- wherein at least one identity of at least one remotely located dispenser includes identities of a plurality of remotely located dispensers;
- wherein the at least one dispensing signal includes a plurality of dispensing signals configured to cause, upon activation of the conditional trigger, dispensing by each of the plurality of dispensers;
- wherein the at least one rule contains an identity of at least one entity associated with the at least one remotely located dispenser;
- wherein activating the conditional trigger includes looking up an identification of the at least one remotely located dispenser based on the identity of the at least one entity;
- wherein the at least one remotely located dispenser is located remote from the at least one processor;
- wherein the input is received from a network access device in a vicinity of the at least one remotely located dispenser;
- wherein the at least one remotely located dispenser and the network access device are located remote from the at least one processor;
- wherein the at least one processor is a server;
- wherein the at least one remotely located dispenser is connected to the server via a network;
- wherein the physical item is a food item;
- wherein the physical item is a gift;
- wherein the at least one remotely located dispenser is a vending machine that holds a plurality of differing food items;
- wherein the at least one signal is configured to dispense a food item in response to the conditional trigger;
- wherein the vending machine is configured to withhold dispensing of the food item associated with the conditional trigger until an identity is locally received by the vending machine;
- receiving over a network, during a presentation, from a plurality of network access devices, a plurality of non-audio signals corresponding to activations of substitute audio buttons, each of the plurality of non-audio signals having an audio identity;
- processing the received plurality of non-audio signals to determine a quantity of non-audio signals corresponding to a specific audio identity;
- performing a lookup in an audio-related data structure to select at least one particular audio file associated with the audio identity and the determined quantity;
- outputting data for causing the at least one particular audio file to be played;
- wherein the audio identity of the substitute audio buttons includes at least one of clapping or laughing;
- wherein processing includes counting a number of non-audio signals received;
- wherein each of the plurality of non-audio signals correspond to a common audio identity;

wherein at least a first group of the plurality of non-audio signals have a first audio identity that differs from a second audio identity of a second group of the plurality of non-audio signals;
wherein processing includes counting a first number of signals in the first group of the plurality of non-audio signals and counting a second number of signals in the second group of the plurality of non-audio signals;
wherein performing a lookup includes identifying a first audio file corresponding to the first group of the plurality of non-audio signals and a second audio file corresponding to the second group of the plurality of non-audio signals;
wherein the outputted data is configured to cause the first audio file and the second audio file to simultaneously play;
wherein outputting is configured to cause the at least one particular audio file to play via the presentation;
wherein outputting is configured to cause the at least one particular audio file to play on the plurality of network access devices;
wherein outputting is configured to cause the at least one particular audio file to play via the presentation on the plurality of network access devices;
wherein the data structure associates a first audio file with a first range of quantities of non-audio signals and a second audio file with a second range of quantities of non-audio signals;
wherein when the determined quantity falls within the first range, outputting is configured to cause the first audio file to playback;
maintaining a count of a quantity of actively connected network access devices, to compare a number of received non-audio signals in a particular time frame with the count, and to select the at least one particular audio file to be played as a function of a correlation between the count and the number of non-audio signals received;
wherein the correlation is a proportion of non-audio signals to the count;
wherein as the proportion increases the output is configured to cause an increase in a volume of play of the selected audio file;
wherein the correlation is a proportion of non-audio signals to the count;
wherein the selection of the at least one audio file is a function of the proportion;
receiving an additional non-audio augmentation signal from an administrator to cause a playback of an audio file different from the particular audio file;
limiting a number of non-audio signals processed from each network access device within a particular time frame;
wherein the limit is a single non-audio signal per unit of time;
processing a plurality of non-audio signals processed from each network access device within a particular time frame;
causing both the at least one particular audio file and graphical imagery to be presented via the plurality of network access devices;
wherein the graphical imagery includes an emoji;
wherein the graphical imagery is correlated to the audio file;
wherein the graphical imagery corresponds to activations of graphical imagery buttons on a plurality of network access devices;
wherein the graphical imagery reflects identities of a plurality of individuals associated with the plurality of network access devices;
wherein the audio-related data structure contains information about a plurality of audio files each associated with a common audio identity;
wherein each of the plurality of audio files corresponds to a differing quantity of non-audio signals.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A digital workflow system for providing physical rewards from disbursed networked dispensers, the system comprising:
    at least one processor configured to:
        maintain and cause to be displayed a workflow table having rows, and columns, and a plurality of cells at intersections of the rows and the columns;
        designate at least one particular cell from the plurality of cells for monitoring by a rule that involves a conditional trigger, wherein the at least one particular cell is configured to maintain data reflecting whether a workflow milestone associated with the at least one particular cell and a specific individual from among a plurality of individuals is reached by the specific individual;
        access at least one data structure that stores the rule containing a condition associated with the at least one particular cell, wherein the rule contains a conditional trigger associated with remote dispensing of a physical item upon the condition being met;
        receive an input via the at least one particular cell, the input including a change in the data and dynamically reflecting that the workflow milestone is reached;
        access the rule to compare the input with the condition;
        based on the comparing of the input with the condition, determine a match identifying the specific individual as having reached the workflow milestone;
        identify, from within the at least one data structure containing identities of a plurality of remotely located dispensers associated with the plurality of individuals, a specific identifier of a specific one of the remotely located dispensers associated with the specific individual; and
        following determination of the match, activate the conditional trigger to cause a dispensing signal to be transmitted over a network to the specific remotely located dispenser associated with the specific individual in order to activate the specific remotely located dispenser, and thereby cause the specific remotely located dispenser to dispense the physical item as a result of the workflow milestone being reached.

2. The system of claim 1, wherein the workflow milestone is associated with at least one of a deadline, a status, a date, or a threshold.

3. The system of claim 1, wherein the specific remotely located dispenser is configured to hold a plurality of confections and to dispense a confection in response to the dispensing signal.

4. The system of claim 1, wherein receiving the input occurs as a result of an update to the at least one particular cell.

5. The system of claim 1, wherein the rule is an automation that associates the at least one particular cell with the condition and an entity.

6. The system of claim 1, wherein the specific identifier of the specific remotely located dispenser includes identities of a set of the plurality of remotely located dispensers, and wherein the dispensing signal includes a plurality of dispensing signals configured to cause, upon activation of the conditional trigger, dispensing by each of the set of the plurality of remotely located dispensers.

7. The system of claim 1, wherein the specific remotely located dispenser is located remote from the at least one processor.

8. The system of claim 1, wherein the input is received from a network access device in a vicinity of the specific remotely located dispenser, and wherein the specific remotely located dispenser and the network access device are located remote from the at least one processor.

9. The system of claim 8, wherein the at least one processor is a server and wherein the specific remotely located dispenser is connected to the server via a network.

10. The system of claim 1, wherein the physical item is a food item.

11. The system of claim 1, wherein the physical item is a gift.

12. The system of claim 1, wherein the specific remotely located dispenser is a vending machine that holds a plurality of differing food items and wherein the signal is configured to dispense a food item in response to the conditional trigger.

13. The system of claim 12, wherein the vending machine is configured to withhold dispensing of the food item associated with the conditional trigger until an identity is locally received by the vending machine.

14. A non-transitory computer readable medium containing instructions that when executed by at least one processor, cause the at least one processor to perform operations for providing physical rewards from disbursed networked dispensers, the operations comprising:

maintaining and causing to be displayed a workflow table having rows, and columns, and a plurality of cells at intersections of the rows and the columns;

designating at least one particular cell from the plurality of cells for monitoring by a rule that involves a conditional trigger, wherein the at least one particular cell is configured to maintain data reflecting whether a workflow milestone associated with the at least one particular cell and a specific individual from among a plurality of individuals is reached by the specific individual;

accessing at least one data structure that stores the rule containing a condition associated with the at least one particular cell, wherein the rule contains a conditional trigger associated with remote dispensing of a physical item upon the condition being met;

receiving an input via the at least one particular cell, the input including a change in the data and dynamically reflecting that the workflow milestone is reached;

accessing the rule to compare the input with the condition;

based on the comparing of the input with the condition, determining a match identifying the specific individual as having reached the workflow milestone;

identifying, from within the at least one data structure containing identities of a plurality of remotely located dispensers associated with the plurality of individuals, a specific identifier of a specific one of the remotely located dispensers associated with the specific individual; and following determination of the match, activating the conditional trigger to cause a dispensing signal to be transmitted over a network to the specific remotely located dispenser associated with the specific individual in order to activate the specific remotely located dispenser, and thereby cause the specific remotely located dispenser to dispense the physical item as a result of the workflow milestone being reached.

15. The non-transitory computer readable medium of claim 14, wherein the specific identifier of the specific remotely located dispenser includes identities of a set of the plurality of remotely located dispensers, and wherein the dispensing signal includes a plurality of dispensing signals configured to cause, upon activation of the conditional trigger, dispensing by each of the set of the plurality of remotely located dispensers.

16. The non-transitory computer readable medium of claim 14, wherein the specific remotely located dispenser is a vending machine that holds a plurality of differing food items, wherein the signal is configured to dispense a food item in response to the conditional trigger, and wherein the vending machine is configured to withhold dispensing of the food item associated with the conditional trigger until the identity of the specific individual is locally received by the vending machine.

17. A method for providing physical rewards from disbursed networked dispensers, the method comprising:

maintaining and causing to be displayed a workflow table having rows, and columns, and a plurality of cells at intersections of the rows and the columns;

designating at least one particular cell from the plurality of cells for monitoring by a rule that involves a conditional trigger, wherein the at least one particular cell is configured to maintain data reflecting whether a workflow milestone associated with the at least one particular cell and a specific individual from among a plurality of individuals is reached by the specific individual;

accessing at least one data structure that stores the rule containing a condition associated with the at least one particular cell, wherein the rule contains a conditional trigger associated with remote dispensing of a physical item upon the condition being met;

receiving an input via the at least one particular cell, the input including a change in the data and dynamically reflecting that the workflow milestone is reached;

accessing the rule to compare the input with the condition;

based on the comparing of the input with the condition, determining a match identifying the specific individual as having reached the workflow milestone;

identifying, from within the at least one data structure containing identities of a plurality of remotely located dispensers associated with the plurality of individuals, a specific identifier of a specific one of the remotely located dispensers associated with the specific individual; and following determination of the match, activating the conditional trigger to cause a dispensing signal to be transmitted over a network to the specific remotely located dispenser associated with the specific individual in order to activate the specific remotely located dispenser, and thereby cause the specific remotely located dispenser to dispense the physical item as a result of the workflow milestone being reached.

18. The method of claim 17, wherein the specific identifier of the specific remotely located dispenser includes identities of a set of the plurality of remotely located dispensers, and wherein the dispensing signal includes a plurality of dispensing signals configured to cause, upon activation of the conditional trigger, dispensing by each of the set of the plurality of remotely located dispensers.

19. The method of claim 17, wherein the specific remotely located dispenser is a vending machine that holds a plurality of differing food items, wherein the signal is configured to dispense a food item in response to the conditional trigger, and wherein the vending machine is configured to withhold dispensing of the food item associated with the conditional trigger until the identity of the specific individual is locally received by the vending machine.

20. The system of claim 1, wherein upon activation of the specific remotely located dispenser, other remotely located dispensers associated with others of the plurality of individuals are not activated.

21. The system of claim 1, wherein activating the conditional trigger includes sending a signal to at least one additional dispenser from the plurality of remotely located dispensers to cause the at least one additional dispenser to execute an action based on the workflow milestone being reached by the specific individual associated with the at least one remotely located dispenser.

22. The system of claim 1, wherein the at least one looked-up remotely located dispenser is geographically distant from the specific individual, and wherein dispensing the physical item includes delivering the physical item to the specific individual via a drone.

23. The system of claim 1, wherein the at least one processor is further configured to enable the specific remotely located dispenser to dispense the physical item in response to a prompt by the specific individual.

24. The system of claim 1, wherein the at least one processor is further configured to activate the specific remotely located dispenser to allow the specific individual to select the physical item to receive from among a plurality of physical items.

25. The system of claim 1, wherein the at least one processor is further configured to associate at least one attribute with the specific individual and identify the specific remotely located dispenser based on the at least one attribute associated with the specific individual.

* * * * *